(12) United States Patent
Xiao et al.

(10) Patent No.: US 12,032,494 B2
(45) Date of Patent: Jul. 9, 2024

(54) KERNEL INTEGRITY PROTECTION METHOD AND APPARATUS

(71) Applicant: HUAWEI TECHNOLOGIES CO., LTD., Guangdong (CN)

(72) Inventors: Fuzhou Xiao, Beijing (CN); Youzhan Yin, Beijing (CN); Dengzhou Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 553 days.

(21) Appl. No.: 16/965,935

(22) PCT Filed: Nov. 26, 2018

(86) PCT No.: PCT/CN2018/117500
§ 371 (c)(1),
(2) Date: Jul. 29, 2020

(87) PCT Pub. No.: WO2019/148948
PCT Pub. Date: Aug. 8, 2019

(65) Prior Publication Data
US 2021/0049112 A1    Feb. 18, 2021

(30) Foreign Application Priority Data

Feb. 2, 2018   (WO) ................ PCT/CN2018/075086
Mar. 2, 2018   (CN) .......................... 201810173059.9

(51) Int. Cl.
*G06F 12/14*     (2006.01)
*G06F 21/53*     (2013.01)
*G06F 21/71*     (2013.01)

(52) U.S. Cl.
CPC ...... *G06F 12/1491* (2013.01); *G06F 12/1416* (2013.01); *G06F 21/53* (2013.01); *G06F 21/71* (2013.01); *G06F 2212/1052* (2013.01)

(58) Field of Classification Search
CPC .. G06F 12/1491; G06F 12/1416; G06F 21/53; G06F 21/71; G06F 2212/1052
See application file for complete search history.

(56) References Cited

U.S. PATENT DOCUMENTS 9,195,518 B1    11/2015  Larsen et al.
2008/0235534 A1  9/2008  Schunter et al.
(Continued)

FOREIGN PATENT DOCUMENTS

CN    101788958 A    7/2010
CN    102667722 A    9/2012
(Continued)

OTHER PUBLICATIONS

Office Action issued in Chinese Application No. 201880016634.2 on Dec. 3, 2020, 13 pages.
(Continued)

*Primary Examiner* — Lynn D Feild
*Assistant Examiner* — Saad Ahmad Abdullah
(74) *Attorney, Agent, or Firm* — HUAWEI TECHNOLOGIES CO., LTD.

(57) ABSTRACT

Embodiments of the present disclosure relate to kernel integrity protection methods and apparatuses. In an embodiment, a method includes: sending, by a first program executing at a first exception level, a request message to a second program executing at a second exception level, wherein the first exception level has lower execution privilege than the second exception level, the request message requests to perform memory access, and wherein the memory access is a preset register access or a preset memory space access, and; in response to receiving the request message, obtaining, by the second program, event information corresponding to the memory access; sending, by the second program, the
(Continued)

event information to the first program; and processing, by the first program, the event information.

19 Claims, 10 Drawing Sheets

(56) References Cited

U.S. PATENT DOCUMENTS

| | | | |
|---|---|---|---|
| 2012/0054544 | A1 | 3/2012 | Floyd et al. |
| 2014/0359749 | A1 | 12/2014 | Rieke et al. |
| 2015/0301761 | A1* | 10/2015 | Sijstermans .......... G06F 3/0644 711/163 |
| 2016/0147993 | A1 | 5/2016 | Xu et al. |
| 2017/0286335 | A1 | 10/2017 | Avoinne et al. |
| 2017/0300430 | A1* | 10/2017 | Kataria ................. G06F 21/50 |
| 2018/0074976 | A1* | 3/2018 | Norris ................ G06F 12/1441 |

FOREIGN PATENT DOCUMENTS

| | | |
|---|---|---|
| CN | 102750202 A | 10/2012 |
| CN | 202694329 U | 1/2013 |
| CN | 103140837 A | 6/2013 |
| CN | 103699498 A | 4/2014 |
| CN | 103765380 A | 4/2014 |
| CN | 104956342 A | 9/2015 |
| CN | 105453029 A | 3/2016 |
| CN | 105787360 A | 7/2016 |
| CN | 107111511 A | 8/2017 |
| CN | 107111715 A | 8/2017 |
| CN | 107211019 A | 9/2017 |
| EP | 2954419 B1 | 3/2017 |
| JP | 2015099461 A | 5/2015 |
| WO | 2014122415 A1 | 8/2014 |

OTHER PUBLICATIONS

Extended European Search Report issued in European Application No. 18904028.0 on Jan. 19, 2021, 10 pages.
Jin et al., "H-SVM: Hardware-Assisted Secure Virtual Machines under a Vulnerable Hypervisor," IEEE Transactions on Computers, vol. 64, No. 10, Oct. 2015, 14 pages.
Office Action issued in Chinese Application No. 201880016634.2 on Jul. 22, 2021, 11 pages.
PCT International Search Report and Written Opinion issued in International Application No. PCT/CN2018/117500 on Jan. 24, 2019, 17 pages (with English translation).
PCT International Search Report and Written Opinion issued in International Application No. PCT/CN2018/075086 on Oct. 24, 2018, 17 pages (with English translation).

\* cited by examiner

KERNEL INTEGRITY PROTECTION METHOD AND APPARATUS

CROSS-REFERENCE TO RELATED APPLICATIONS

This application is a national stage of International Application No. PCT/CN2018/117500, filed on Nov. 26, 2018, which claims priority to Chinese Patent Application No. 201810173059.9, filed on Mar. 2, 2018, and International Application No. PCT/CN2018/075086, filed on Feb. 2, 2018. All of the aforementioned patent applications are hereby incorporated by reference in their entireties.

TECHNICAL FIELD

This application relates to the field of electronic devices, and in particular, to a kernel integrity protection method and apparatus.

BACKGROUND

Operating system security is an indispensable part of computing device system security. In an operating system, after a system kernel obtains execution permission on a processor, execution of malicious code in the kernel usually cannot be interfered with. Therefore, common kernel integrity detection can only statically measure kernel integrity. Before a malicious intrusion occurs, or when a malicious intrusion has already occurred, such measurement cannot terminate an intrusion in real time.

To terminate the intrusion in real time, a necessary functional module needs to be implemented in the kernel or a hook (hook) program needs to be set in the kernel in most kernel integrity protection methods, to implement kernel intrusion check and protection, for example, return address protection (return address protection, RAP), control flow integrity (control flow integrity, CFI) protection, and stack overflow protection. The added functional module or program is at a same layer as the kernel. Therefore, the kernel integrity cannot be ensured in the method, and in a sense, the kernel integrity is damaged in these solutions. When the kernel has a vulnerability, an existing protection technology may be bypassed or cracked. Check code configured in the kernel greatly affects system performance and power consumption.

Therefore, a more secure kernel integrity protection method is required to protect the kernel.

SUMMARY

Embodiments of the present invention provide a kernel integrity protection method and apparatus, to dynamically measure kernel integrity and terminate an intrusion in real time. This ensures higher security.

According to a first aspect, a kernel integrity protection method is provided, where the kernel integrity protection method is performed by a kernel integrity protection apparatus, the kernel integrity protection apparatus includes a processor execution unit, a running space divided by the processor execution unit includes a first running space and a second running space, and an exception level of the second running space is higher than an exception level of the first running space; and the kernel integrity protection method includes: sending, by a first processing module running in the first running space, a request message to a second processing module running in the second running space, where the request message is used to request to perform memory access, and the memory access relates to preset register access and/or preset memory space access; in response to the request message, obtaining, by the second processing module running in the second running space, information about an event corresponding to the memory access; sending, by the second processing module running in the second running space, the information to the first processing module running in the first running space; and processing, by the first processing module running in the first running space, the event based on the information.

In this embodiment of the present invention, the exception level of the second running space is higher than the exception level of the first running space, and the first processing module in the first running space needs to be authorized by the second processing module in the second running space when the first processing module in the first running space needs to perform specific memory access. Therefore, the first processing module in the first running space cannot randomly perform the register and/or the memory space access. When the second processing module running in the second running space determines that a check result is that the memory access is invalid, the second processing module running in the second running space further instructs the first processing module running in the first running space to process the attack event, to dynamically measure kernel integrity and terminate an intrusion in real time. This ensures higher security.

In a possible implementation, the first running space is kernel space, the first processing module is an operating system, and the second running space is super management space or security monitoring space.

It may be understood that, the exception level of the super management space or the security monitoring space is higher than the exception level of the kernel space, so as to instruct the operating system to process the attack event when a processing module in the super management space or the security monitoring space detects that the operating system running in the kernel space is attacked. In addition, permission on the super management space or the security monitoring space is higher than permission on the kernel space. When the kernel space is attacked, an execution flow is automatically switched to the super management space or the security monitoring space. To implement the automatic switching, configuration may be performed at an initial stage of starting a processor, to be specific, the configuration is performed when the processor is in the super management space or in the security monitoring space. After the operating system runs in the kernel space, because there is no interface in the super management space or in the security monitoring space for an application program and only an exception handling interface, the super management space or the security monitoring space cannot be intruded. This ensures high security.

In a possible implementation, the preset register access includes: reading or writing a system control register. This implementation can prevent malicious tampering with the preset register.

In a possible implementation, the preset memory space access includes: at least one of modifying a kernel code segment, disabling a memory management unit (memory management unit, MMU), modifying a kernel page table, and modifying a user page table. According to this implementation, a plurality of operations of attempting to modify a kernel can be detected. It may be understood that a detection operation may include but is not limited to at least one of the foregoing operations.

In a possible implementation, the running space divided by the processor execution unit further includes a third running space, an exception level of the third running space is lower than the exception level of the first running space; and the processing, by the first processing module running in the first running space, the event based on the information includes: based on the information, sending, by the first processing module running in the first running space, a signal to a third processing module running in the third running space, where the signal is used to end a process corresponding to the event. According to this implementation, a manner of processing the attack may include ending the attack process, so as to terminate an intrusion in real time.

In a possible implementation, the running space divided by the processor execution unit further includes a third running space, an exception level of the third running space is lower than the exception level of the first running space; and the processing, by the first processing module running in the first running space, the event based on the information includes: based on the information, reporting, by the first processing module running in the first running space, a log to a fourth processing module running in the third running space, where the log includes the information. According to this implementation, a manner of processing the attack may include reporting the attack log to the third running space, so as to record attack information and facilitate subsequent statistical analysis and further processing of the attack information.

In a possible implementation, the method further includes: uploading, by the fourth processing module running in the third running space, the log to a cloud server; and receiving, by the fourth processing module running in the third running space, a security policy or a patch from the cloud server. According to this implementation, after the fourth processing module running in the third running space receives the security policy or the patch from the cloud server, an intrusion can be terminated in real time, and a similar attack can be prevented subsequently.

In a possible implementation, the third running space is user program space. According to this implementation, it can be ensured that the processing of the attack event is visible to a user.

In a possible implementation, the information includes at least one of an attack type, a name of an attack process, and a port number. It may be understood that the attack information may be obtained by reading a specific register. According to this implementation, the security policy or the patch may be optimized by collecting statistics on and analyzing a plurality of types of attack information.

Running data in an operating system of an electronic device is stored in a memory. Some of the running data is important and needs to be protected, that is, cannot be changed randomly.

If the unchangeable data is changed, an electronic device fault or an information security vulnerability is usually caused.

For example, if the important data in the operating system of the electronic device is maliciously changed, an operating system running error is caused, and consequently the electronic device fault or the information security vulnerability is caused.

In a conventional electronic device, important data may be protected in the following manner: an attribute of a memory in which the important data is located is set to read-only by using an operating system, so as to protect the important data from being maliciously modified.

However, the protection method has relatively low security. For example, after malware obtains management permission on the operating system, the malware may remove the read-only attribute of the memory set by using the operating system, so as to modify the important data.

Therefore, a more secure data protection method is required to protect the data.

In a possible implementation, the kernel integrity protection method is specifically a data protection method, the kernel integrity protection apparatus is specifically a data protection apparatus, and the data protection apparatus includes the processor execution unit and a memory management unit; and the data protection method includes:

sending, by the first processing module running in the first running space, a first message to the memory management unit, where the first message is used to request to modify an attribute of a first memory;

sending, by the memory management unit, a second message to the second processing module running in the second running space, where the second message is used to request to determine whether the first memory is protected;

based on a pre-obtained memory protection table, determining, by the second processing module running in the second running space, whether the first memory is protected;

sending, by the second processing module running in the second running space, a third message to the memory management unit, where the third message is used to indicate whether to modify the attribute of the first memory; and if the third message is used to instruct to modify the attribute of the first memory, modifying, by the memory management unit, the attribute of the first memory based on the first message; and if the third message is used to instruct not to modify the attribute of the first memory, rejecting, by the memory management unit, modifying the attribute of the first memory.

In the data protection method, an exception level of the second running space is higher than an exception level of the first running space, and the first processing module in the first running space needs to be authorized by the second processing module in the second running space when the first processing module in the first running space needs to modify the attribute of the memory. Therefore, the first processing module in the first running space cannot randomly modify the attribute of the memory, finally improving data security.

In a possible implementation, before the determining, by the second processing module running in the second running space and based on a pre-obtained memory protection table, whether the first memory is protected, the data protection method further includes:

sending, by the first processing module in the first running space, a fourth message to the second processing module in the second running space, where the fourth message is used to indicate whether the first memory is protected; and based on the fourth message, generating, by the second processing module in the second running space, the memory protection table, where the memory protection table is used to record a protected memory and/or an unprotected memory, the protected memory includes a memory configured to store protected data, and the unprotected memory includes a memory configured to store unprotected data.

In this implementation, the first processing module in the first running space may indicate, to the second processing module in the second running space, which memory is protected and/or which memory is unprotected.

In a possible implementation, before the determining, by the second processing module running in the second running space and based on a pre-obtained memory protection table, whether the first memory is protected, the data protection method further includes:

determining, by the second processing module running in the second running space, that the first memory is configured to store protected data or that the first memory is configured to store unprotected data; and generating, by the second processing module running in the second running space, the memory protection table, where the memory protection table is used to record that the first memory is a protected memory or is used to record that the first memory is an unprotected memory, the protected memory includes a memory configured to store the protected data, and the unprotected memory includes a memory configured to store the unprotected data.

In this implementation, the protected memory and/or the unprotected memory may be pre-determined.

In a possible implementation, the first running space is kernel space, the first processing module is an operating system, and the second running space is super management space, and the protected data includes: constant data written by the operating system into a memory in a compilation phase, and constant data written by the operating system into the memory in an initialization phase.

In a possible implementation, the data protection apparatus is a mobile phone, a tablet computer, a server, a personal computer, a network router, or a switch.

According to a second aspect, a kernel integrity protection apparatus is provided, where the kernel integrity protection apparatus includes a processor execution unit, a running space divided by the processor execution unit includes a first running space and a second running space, an exception level of the second running space is higher than an exception level of the first running space, a first processing module runs in the first running space, and a second processing module runs in the second running space, where the first processing module is configured to send a request message to the second processing module, where the request message is used to request to perform memory access, and the memory access relates to preset register access and/or preset memory space access; and the second processing module is configured to: in response to the request message, obtain information about an event corresponding to the memory access, and send the information to the first processing module running in the first running space; where the first processing module is further configured to process the event based on the information.

In a possible implementation, the first running space is kernel space, the first processing module is an operating system, and the second running space is super management space or security monitoring space.

In a possible implementation, the preset register access that the first processing module is configured to request includes:

reading or writing a system control register.

In a possible implementation, the preset memory space access that the first processing module is configured to request includes:

at least one of modifying a kernel code segment, disabling a memory management unit, modifying a kernel page table, and modifying a user page table.

In a possible implementation, the running space divided by the processor execution unit further includes a third running space, an exception level of the third running space is lower than the exception level of the first running space, and a third processing module runs in the third running space, and the first processing module is specifically configured to send a signal to the third processing module based on the information, where the signal is used to end a process corresponding to the event.

In a possible implementation, the running space divided by the processor execution unit further includes a third running space, an exception level of the third running space is lower than the exception level of the first running space, and a fourth processing module runs in the third running space, and the first processing module is specifically configured to report a log to the fourth processing module based on the information, where the log includes the information.

In a possible implementation, the fourth processing module is further configured to: upload the log to a cloud server; and receive a security policy or a patch from the cloud server.

In a possible implementation, the third running space is user program space.

In a possible implementation, the attack information includes at least one of an attack type, a name of an attack process, and a port number.

In a possible implementation, the apparatus is specifically a data protection apparatus, and the data protection apparatus includes the processor execution unit and a memory management unit, and the first processing module is configured to send a first message to the memory management unit, where the first message is used to request to modify an attribute of a first memory;

the memory management unit is configured to send a second message to the second processing module, where the second message is used to request to determine whether the first memory is protected; and the second processing module is configured to determine, based on a pre-obtained memory protection table, whether the first memory is protected; where the second processing module is further configured to send a third message to the memory management unit, where the third message is used to indicate whether to modify the attribute of the first memory; and the memory management unit is further configured to: when the third message is used to instruct to modify the attribute of the first memory, modify the attribute of the first memory based on the first message, and when the third message is used to instruct not to modify the attribute of the first memory, reject modifying the attribute of the first memory.

In a possible implementation, the first processing module is further configured to send a fourth message to the second processing module in the second running space, where the fourth message is used to indicate whether the first memory is protected, and before determining, based on the pre-obtained memory protection table, whether the first memory is protected, the second processing module is further configured to generate the memory protection table based on the fourth message, where the memory protection table is used to record a protected memory and/or an unprotected memory, the protected memory includes a memory configured to store protected data, and the unprotected memory includes a memory configured to store unprotected data.

In a possible implementation, before determining, based on the pre-obtained memory protection table, whether the first memory is protected, the second processing module is further configured to:
  determine that the first memory is configured to store protected data or determine that the first memory is configured to store unprotected data; and
  generate the memory protection table, where the memory protection table is used to record that the first memory is a protected memory or is used to record that the first memory is an unprotected memory, the protected memory includes a memory configured to store the protected data, and the unprotected memory includes a memory configured to store the unprotected data.

In a possible implementation, the first running space is kernel space, the first processing module is an operating system, the second running space is super management space, and the protected data includes: constant data written by the operating system into a memory in a compilation phase, and constant data written by the operating system into the memory in an initialization phase.

In a possible implementation, the data protection apparatus is a mobile phone, a tablet computer, a server, a personal computer, a network router, or a switch.

In a possible design, the kernel integrity protection apparatus is a system chip, and the system chip includes a processor and an output interface, where the processor includes a processor execution unit, and the output interface is configured to output a physical address of a first memory to an address bus when the processor execution unit relates to preset register access and/or preset memory space access; or the processor further includes a memory management unit, and the output interface is configured to output a physical address of a first memory to an address bus when the memory management unit modifies an attribute of the first memory.

Optionally, the kernel integrity protection apparatus may further include a memory, where the memory is configured to store program code that is executed by the processor execution unit, a kernel code segment, a kernel page table, a user page table, and the like, or the memory is configured to store program code that is executed by the processor execution unit, protected data, unprotected data, and the like.

According to a third aspect, this application provides a computer-readable storage medium, where the computer-readable storage medium stores program code executed by a kernel integrity protection apparatus, and the program code includes an instruction used to perform the kernel integrity protection method in any one of the first aspect or the possible implementations of the first aspect.

According to a fourth aspect, this application provides a computer program product including an instruction, where when the computer program product runs on a kernel integrity protection apparatus, the kernel integrity protection apparatus is enabled to perform the kernel integrity protection method in any one of the first aspect or the possible implementations of the first aspect.

According to a fifth aspect, this application provides a data protection apparatus, where the data protection apparatus includes a processor execution unit and a memory management unit, a running space divided by the processor execution unit includes kernel space and super management space, and an exception level of the super management space is higher than an exception level of the kernel space; and
  an operating system running in the kernel space is configured to send a first message to the memory management unit, where the first message is used to request to modify an attribute of a first memory;
  the memory management unit is configured to send a second message to a critical data protection module running in the super management space, where the second message is used to request to determine whether the first memory is protected;
  the critical data protection module is configured to determine, based on a pre-obtained memory protection table, whether the first memory is protected; where
  the critical data protection module is further configured to send a third message to the memory management unit, where the third message is used to indicate whether to modify the attribute of the first memory; and
  the memory management unit is further configured to: when the third message is used to instruct to modify the attribute of the first memory, modify the attribute of the first memory based on the first message, and when the third message is used to instruct not to modify the attribute of the first memory, reject modifying the attribute of the first memory.

In a possible implementation, the operating system is further configured to send a fourth message to the critical data protection module, where the fourth message is used to indicate whether the first memory is protected, and
  before determining, based on the pre-obtained memory protection table, whether the first memory is protected, the critical data protection module is further configured to generate the memory protection table based on the fourth message, where the memory protection table is used to record a protected memory and/or an unprotected memory, the protected memory includes a memory configured to store protected data, and the unprotected memory includes a memory configured to store unprotected data.

In a possible implementation, before determining, based on the pre-obtained memory protection table, whether the first memory is protected, the critical data protection module is further configured to:
  determine that the first memory is configured to store protected data or determine that the first memory is configured to store unprotected data; and
  generate the memory protection table, where the memory protection table is used to record that the first memory is a protected memory or is used to record that the first memory is an unprotected memory, the protected memory includes a memory configured to store the protected data, and the unprotected memory includes a memory configured to store the unprotected data.

In a possible implementation, the protected data includes: constant data written by the operating system into a memory in a compilation phase, and constant data written by the operating system into the memory in an initialization phase.

DESCRIPTION OF EMBODIMENTS

A computer to which a kernel integrity protection method and a kernel integrity protection apparatus in the embodiments of this application can be applied may be an electronic device such as a mobile phone, a tablet computer, a server, a personal computer, a network router, a wearable device, or a switch.

Optionally, in an embodiment, the kernel integrity protection method may be specifically a data protection method, and the kernel integrity protection apparatus may be specifically a data protection apparatus.

The computer may include a processor and a memory. The processor may also be referred to as a central processing unit (central processing unit, CPU) or a central processing unit.

An example of the processor in the computer is a reduced instruction system (Advanced RISC Machines, ARM) processor. An example of the memory in the computer is a random access memory (random access memory, RAM) or a flash (Flash) memory. The RAM may also be referred to as a main memory or a memory. The memory has an access permission attribute, for example, read-only, writable, executable, and inaccessible.

A virtualization technology is used in the processor of the computer. The virtualization technology may hide underlying physical hardware of the computer, that a plurality of operating systems (operator system, OS) running independently may transparently use and share a hardware resource of the computer. Simply speaking, the virtualization technology may enable the computer to concurrently run the plurality of OSs.

The processor in the computer provides different permission levels for program code to gain access to a resource on the computer, so as to protect data on the computer and prevent malicious behavior from occurring on the computer, thereby ensuring computer security.

Figure 1:
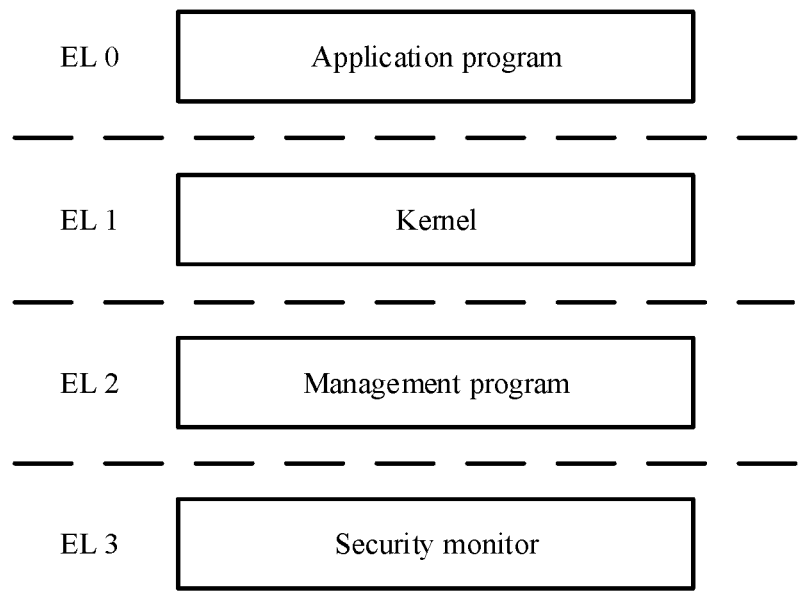
FIG. 1 is a schematic diagram of an exception level according to an embodiment of the present invention.

For example, as shown in FIG. 1, four exception levels (Exception levels, EL) may be defined in the ARM processor: an EL 0, an EL 1, an EL 2, and an EL 3. A larger value indicates a higher exception level, and a smaller value indicates a lower exception level. For example, a level of the EL 0 is lower than a level of the EL 1, the level of the EL 1 is lower than a level of the EL 2, and the level of the EL 2 is lower than a level of the EL 3. Certainly, the larger value may indicate the lower exception level, and the smaller value may indicate the higher exception level. This is not limited in the embodiments of this application.

Different exception levels correspond to different levels of running spaces. Division into the exception level or division into the running space provides logically separated execution permission for all operating software. It should be understood that the exception level in this application is similar to a common classified protection domain in computer science, and supports a concept related to the classified protection domain.

The following is an example of software running at each of the four exception levels: a common user application program, which runs in a running space corresponding to the EL 0, an operating system kernel, for example, Linux or Windows, which may run in a running space corresponding to the EL 1, and is usually considered to be privileged, a management program (hypervisor), which runs in a running space corresponding to the EL 2, and low-level firmware, for example, a security monitor, that runs in a running space corresponding to the EL 3. The hypervisor may also be referred to as a super manager.

The management program in an enabled state may provide a virtualization service for one or more operating system kernels.

Firmware first runs when the processor starts. The firmware provides many services, for example, initializing a platform, installing a trusted operating system, and routing a command from the security monitor.

One piece of software (for example, the user application program, the operating system kernel, or the management program) usually occupies an independent exception level, or occupies an independent running space. Certainly, there may be exceptions, for example, a kernel management program, such as a kernel virtual machine (kernel virtual machine, KVM), may run in the running space corresponding to the EL 2, or may run in the running space corresponding to the EL 1.

In the processor of the computer, a CPU execution unit may manage the memory or perform memory access by using a memory management unit (memory management unit, MMU). For example, the MMU can perform operations such as mapping an address and providing memory access authorization.

In the processor, when program code running in running spaces corresponding to different exception levels performs memory access, the MMU performs different address mapping and different memory access authorization procedures.

The ARM processor includes the following types of exceptions (exception):
 interruption (interrupts), which is triggered by a peripheral and is a typical asynchronous exception;
 abortion (aborts), which may be a synchronous exception or an asynchronous exception, including an instruction exception (generated when an instruction is read) and a data exception (generated when memory data is read or written), may be generated by the memory management unit (memory management unit, MMU) (for example, a typical page fault exception), or may be generated by an external storage system (usually a hardware problem); and reset (reset), which is considered as a special exception, and is an exception triggered by an exception trigger instruction (exception generating instructions).

When any type of the foregoing exceptions occurs, exception processing is performed based on the exception level.

An exception processing process in the ARM processor includes a hardware automatic completion part and a software part, and needs to set an interrupt vector and saves a context. Processing manners for different exception types may be slightly different. In a user mode (EL 0), an exception cannot be processed. When an exception occurs in the user mode, an exception level (EL) is switched to a kernel mode (the EL 1) by default.

Figure 2:
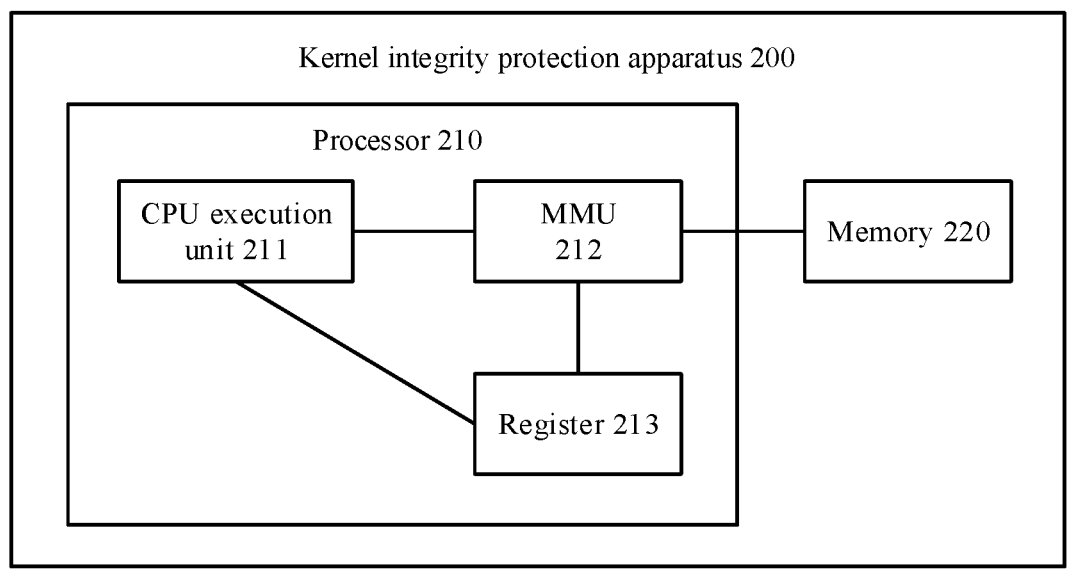
FIG. 2 is a schematic structural diagram of a kernel integrity protection apparatus according to an embodiment of the present invention.

The following uses a kernel integrity protection apparatus 200 shown in FIG. 2 as an example to describe the kernel integrity protection method provided in this application. It should be understood that the kernel integrity protection apparatus 200 shown in FIG. 2 is merely an example. The kernel integrity protection apparatus in this embodiment of this application may further include other modules or units, modules having functions similar to functions of modules in FIG. 2, or not necessarily include all the modules in FIG. 2.

The kernel integrity protection apparatus 200 shown in FIG. 2 includes a processor 210 and a memory 220. The memory 220 may exchange data with the processor 210.

An example of the memory 220 is a random access memory (random access memory, RAM). The RAM may also be referred to as a main memory or a memory. Another example of the memory 220 is a flash (Flash) memory. It should be understood that a memory in the following embodiments may be replaced with the flash memory.

An example of the processor 210 is a central processing unit (central processing unit, CPU). The CPU may also be referred to as a central processing unit.

The processor 210 may include a CPU execution unit 211, a memory management unit 212, and a register 213. It should be understood that, that the memory management unit 212 and the register 213 are integrated into the processor 210 is merely an example. The memory management unit 212 and the register 213 may alternatively be located outside the processor 210.

Figure 3:
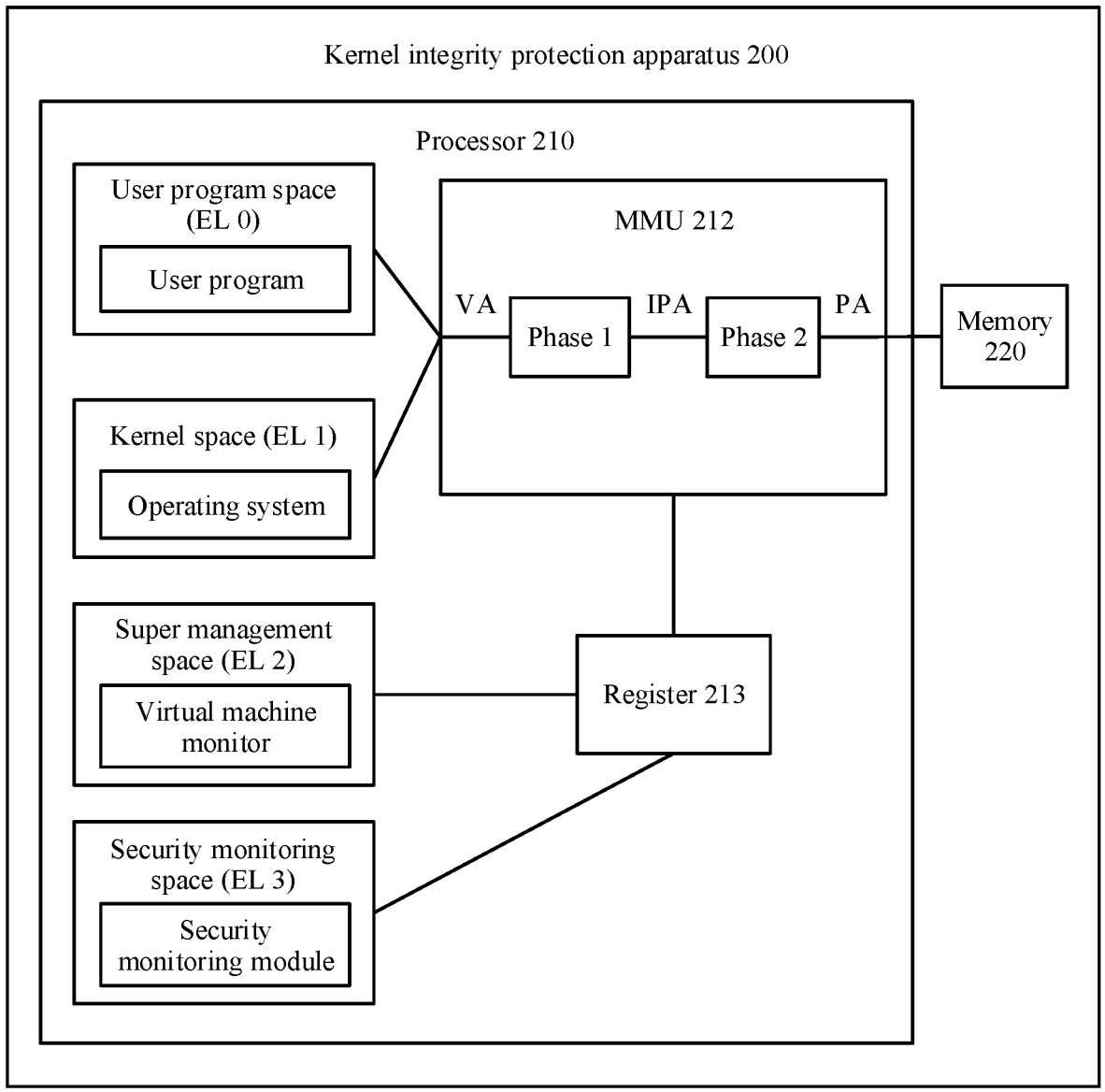
FIG. 3 is a schematic structural diagram of another kernel integrity protection apparatus according to an embodiment of the present invention.

As shown in FIG. 3, four exception levels (exception level, EL) are defined for the processor 210, or in other words, program code executed by the CPU execution unit 211 may be classified into four exception levels. The four exception levels are an EL 0, an EL 1, an EL 2, and an EL 3 in ascending order. The EL 0, the EL 1, the EL 2, and the EL 3 correspond to four running spaces.

A running space corresponding to the EL 0 is user program space, and a user program runs in the user program space. The user program may also be referred to as an application program.

A running space corresponding to the EL 1 is kernel (kernel) space, and an operating system (operating system, OS) runs in the kernel space. The operating system running in the kernel space may also be referred to as a client (guest) operating system.

A running space corresponding to the EL 2 is super management space, and a management program (hypervisor) runs in the super management space. The hypervisor may also be referred to as a virtual machine monitor (virtual machine monitor). The hypervisor is an intermediate software layer running between physical hardware and the operating system, and can allow a plurality of operating systems and application programs to share one piece of basic physical hardware.

From the perspective of system security, main functions of the hypervisor are memory management and interruption interception. In the two manners, the hypervisor can monitor running of the operating system in the kernel space.

The hypervisor can implement the memory management by using a two-phase (stage 2) memory mapping function of the MMU 212. The MMU 212 can implement the memory management by using a technology such as a shadow page table or an EPT page table.

The hypervisor can also prevent malicious tampering by monitoring the register 213.

As shown in FIG. 3, after receiving a virtual address (virtual address, VA) sent from the user program space or the kernel space, the MMU 212 can map, in a phase 1 (stage-1), the address sent by the operating system in the kernel space or the user program in the user program space to an intermediate physical address, and in a phase 2 (stage-2), the MMU 212 can map the intermediate physical address (immediate physical address, IPA) to an address of a memory chip.

The address sent by the operating system in the kernel space or the user program in the user program space may be referred to as the virtual address, or the address visible to the operating system or the user program is the VA. An actual address of the memory chip is referred to as a physical address. An address used in a process in which the VA is mapped to the physical address (physical address, PA) may be referred to as the IPA.

It should be noted that the stage-2 memory mapping function is valid only for the operating system running in the kernel space and the user program in the user program space. In other words, the stage-2 memory mapping function needs to be used only when the operating system running in the kernel space and the user program in the user program space perform memory access.

Implementation of the two-phase memory mapping function of the MMU 212 described above is merely an example. For the implementation of the two-phase memory mapping function of the MMU 212, refer to the prior art. Details are not described herein.

The memory has an access permission attribute. For ease of description, in this embodiment of this application, the access permission attribute of the memory is referred to as an attribute of the memory for short.

The attributes of the memory may include read-only, writable, inaccessible, and executable. That the attribute of the memory is read-only means that content in the memory can be read only, and the content in the memory cannot be modified. That the attribute of the memory is writable means that the content in the memory can be read, and the content in the memory can also be modified.

After receiving the address sent by the operating system in the kernel space or the user program in the user program space, the MMU 212 can gain access to, based on the attribute of the memory corresponding to the address, the content in the memory corresponding to the address.

For example, if the operating system in the kernel space or the user program in the user program space requests the MMU 212 to write data into a memory corresponding to an address, and an attribute of the memory corresponding to the address is writable, the MMU 212 maps the address to a physical address of the memory, and then sends the physical address to the address bus, so that the data is written into the memory.

For example, if the operating system in the kernel space or the user program in the user program space requests the MMU 212 to write the data into the memory corresponding to the address, but the attribute of the memory corresponding to the address is read-only, the MMU 212 rejects the request. An example of the MMU 212 rejecting the request is providing an exception prompt message.

In the data protection apparatus 200, the operating system running in the kernel space may invoke the hypervisor by using a super management call (hypervisor call, HVC) instruction.

A security monitoring module of the processor runs in security monitoring (secure monitor) space corresponding to the EL 3.

It should be understood that division into the running space in the processor shown in FIG. 3 is merely an example. The running space may be divided into more or fewer running spaces in the processor. This is not limited in this application.

Figure 4:
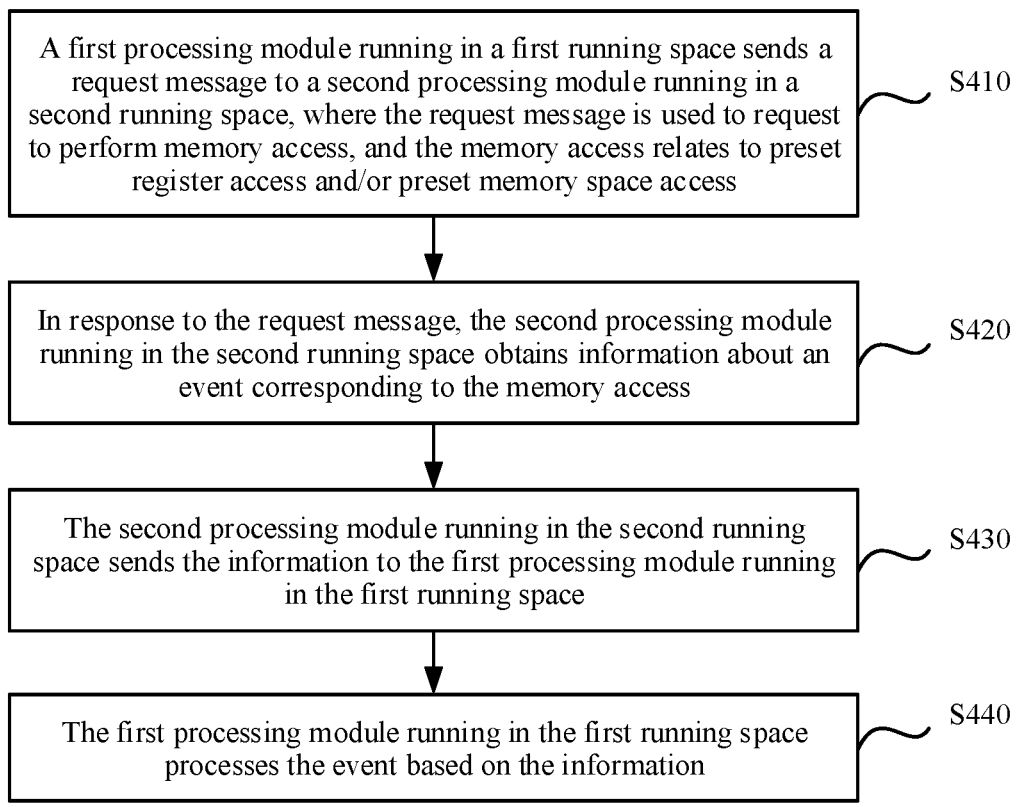
FIG. 4 is a flowchart of a kernel integrity protection method according to an embodiment of the present invention.

FIG. 4 is a schematic flowchart of a kernel integrity protection method according to an embodiment of this application. The kernel integrity protection method may be performed by the kernel integrity protection apparatus 200. The kernel integrity protection method shown in FIG. 4 includes steps S410, S420, S430, and S440.

It should be understood that FIG. 4 shows steps or operations of the kernel integrity protection method, but these steps or operations are merely examples. In this embodiment of this application, other operations or variants of the operations in FIG. 4 may alternatively be performed. In addition, the steps in FIG. 4 may be performed in a sequence different from that shown in FIG. 4, and possibly not all the operations in FIG. 4 need to be performed.

S410. A first processing module running in a first running space sends a request message to a second processing module running in a second running space, where the request message is used to request to perform memory access, and the memory access relates to preset register access and/or preset memory space access.

In a possible implementation, the first running space is kernel space, the first processing module is an operating system, and the second running space is super management space or security monitoring space.

It may be understood that, the exception level of the super management space or the security monitoring space is higher than the exception level of the kernel space, so as to instruct the operating system to process the attack event when a processing module in the super management space or the security monitoring space detects that the operating system running in the kernel space is attacked. In addition, permission on the super management space or the security monitoring space is higher than permission on the kernel space. When the kernel space is attacked, an execution flow is automatically switched to the super management space or the security monitoring space. To implement the automatic switching, configuration may be performed at an initial stage of starting a processor, to be specific, the configuration is performed when the processor is in the super management space or in the security monitoring space. After the operating system runs in the kernel space, because there is no interface in the super management space or in the security monitoring space for an application program and only an exception handling interface, the super management space or the security monitoring space cannot be intruded. This ensures high security.

In a possible implementation, the preset register access includes: reading or writing a system control register. This implementation can prevent malicious tampering with the preset register.

In a possible implementation, the preset memory space access includes: at least one of modifying a kernel code segment, disabling a memory management unit, modifying a kernel page table, and modifying a user page table. According to this implementation, a plurality of operations of attempting to modify a kernel can be detected. It may be understood that a detection operation may include but is not limited to at least one of the foregoing operations.

S420. In response to the request message, the second processing module running in the second running space obtains information about an event corresponding to the memory access.

In an example, the second processing module running in the second running space performs validity check on the memory access, and determines that a check result is that the memory access is invalid.

In an example, the processing module running in the second running space determines, based on a pre-obtained memory protection table, whether the first memory accessed by using the memory access is protected, where the memory protection table is used to record a protected memory and/or an unprotected memory. The protected memory may be understood as storing protected data. The protected data may include at least one type of the following data: constant data of the operating system, and data that is generated in a running process of the operating system and that needs to be protected. The constant data of the operating system may include at least one type of the following data: constant data that appears in a compilation phase of the operating system, and constant data that appears in an initialization phase of the operating system. From another perspective, an explanation of the protected memory is: attributes of the memory cannot be modified from any one of read-only, inaccessible, and executable to writable; and an explanation of the unprotected memory is: attributes of the memory may be modified from any attribute to any other attribute. If the first memory accessed by the memory access is protected, changing the memory attribute is considered as invalid memory access.

S430. The second processing module running in the second running space sends the information to the first processing module running in the first running space.

In a possible implementation, the information includes at least one of an attack type, a name of an attack process, and a port number. According to this implementation, the security policy or the patch may be optimized by collecting statistics on and analyzing a plurality of types of attack information.

S440. The first processing module running in the first running space processes the event based on the information.

In a possible implementation, a running space divided by the processor execution unit further includes a third running space, and an exception level of the third running space is lower than an exception level of the first running space. That the first processing module running in the first running space processes the event based on the information includes: the first processing module running in the first running space sends a signal to a third processing module running in the third running space based on the information, where the signal is used to end a process corresponding to the event. According to this implementation, a manner of processing the attack may include ending the attack process, so as to terminate an intrusion in real time.

In a possible implementation, a running space divided by the processor execution unit further includes a third running space, and an exception level of the third running space is lower than an exception level of the first running space. That the first processing module running in the first running space processes the event based on the information includes: the first processing module running in the first running space reports a log to a fourth processing module running in the third running space based on the information, where the log includes the information. According to this implementation, a manner of processing the attack may include reporting the attack log to the third running space, so as to record attack information and facilitate subsequent statistical analysis and further processing of the attack information.

In a possible implementation, the method further includes: the fourth processing module running in the third running space uploads the log to a cloud server; and the fourth processing module running in the third running space receives the security policy or the patch from the cloud server. According to this implementation, after the fourth processing module running in the third running space receives the security policy or the patch from the cloud server, an intrusion can be terminated in real time, and a similar attack can be prevented subsequently.

In a possible implementation, the third running space is user program space. According to this implementation, it can be ensured that the processing of the attack event is visible to a user.

Optionally, in an embodiment, the kernel integrity protection method is specifically a data protection method, the kernel integrity protection apparatus is specifically a data protection apparatus, and the data protection apparatus includes the processor execution unit and a memory management unit.

Step S410 includes:
the first processing module running in the first running space sends a first message to the memory management unit, where the first message is used to request to modify an attribute of a first memory; and
the memory management unit sends a second message to the second processing module running in the second running space, where the second message is used to request to determine whether the first memory is protected.

Step S420 includes:
the second processing module running in the second running space determines, based on a pre-obtained memory protection table, whether the first memory is protected, and
the method further includes:
the second processing module running in the second running space sends a third message to the memory management unit, where the third message is used to indicate whether to modify the attribute of the first memory; and
if the third message is used to instruct to modify the attribute of the first memory, the memory management unit modifies the attribute of the first memory based on the first message; and if the third message is used to instruct not to modify the attribute of the first memory, the memory management unit rejects modifying the attribute of the first memory.

In an example, before the second processing module running in the second running space determines, based on the pre-obtained memory protection table, whether the first memory is protected, the data protection method further includes:
the first processing module in the first running space sends a fourth message to the second processing module in the second running space, where the fourth message is used to indicate whether the first memory is protected; and
the second processing module in the second running space generates the memory protection table based on the fourth message, where the memory protection table is used to record a protected memory and/or an unprotected memory, the protected memory includes a memory configured to store protected data, and the unprotected memory includes a memory configured to store unprotected data.

In an example, before the second processing module running in the second running space determines, based on the pre-obtained memory protection table, whether the first memory is protected, the data protection method further includes:
the second processing module running in the second running space determines that the first memory is configured to store protected data or that the first memory is configured to store unprotected data; and
the second processing module running in the second running space generates the memory protection table, where the memory protection table is used to record that the first memory is a protected memory or is used to record that the first memory is an unprotected memory, the protected memory includes a memory configured to store the protected data, and the unprotected memory includes a memory configured to store the unprotected data.

In an example, the first running space is kernel space, the first processing module is an operating system, and the second running space is super management space.

The protected data includes: constant data written by the operating system into a memory in a compilation phase, and constant data written by the operating system into the memory in an initialization phase.

In an example, the data protection apparatus is a mobile phone, a tablet computer, a server, a personal computer, a network router, or a switch.

In this embodiment of the present invention, an exception level of the second running space is higher than an exception level of the first running space, and the first processing module in the first running space needs to be authorized by the second processing module in the second running space when the first processing module in the first running space needs to perform specific memory access. Therefore, the first processing module in the first running space cannot randomly perform the register and/or the memory space access. When the second processing module running in the second running space determines that a check result is that the memory access is invalid, the second processing module running in the second running space further instructs the first processing module running in the first running space to process the attack event, to dynamically measure kernel integrity and terminate an intrusion in real time. This ensures higher security.

In an example, an interrupt vector table may be set to trap in a virtualization layer or a security monitoring layer from a kernel layer.

By default, an exception (exception) occurring in an EL 0 and an EL 1 responds in the EL 1. In this embodiment of the present invention, an EL 2-related register and an EL 3-related register are configured, so that the exception (exception) may respond in an EL 2 or an EL 3. For example, related bits (bit) of HDCR_EL2 and HCR_EL2 in the EL 2 and SCR_EL3 in the EL 3 are configured.

Figure 5:
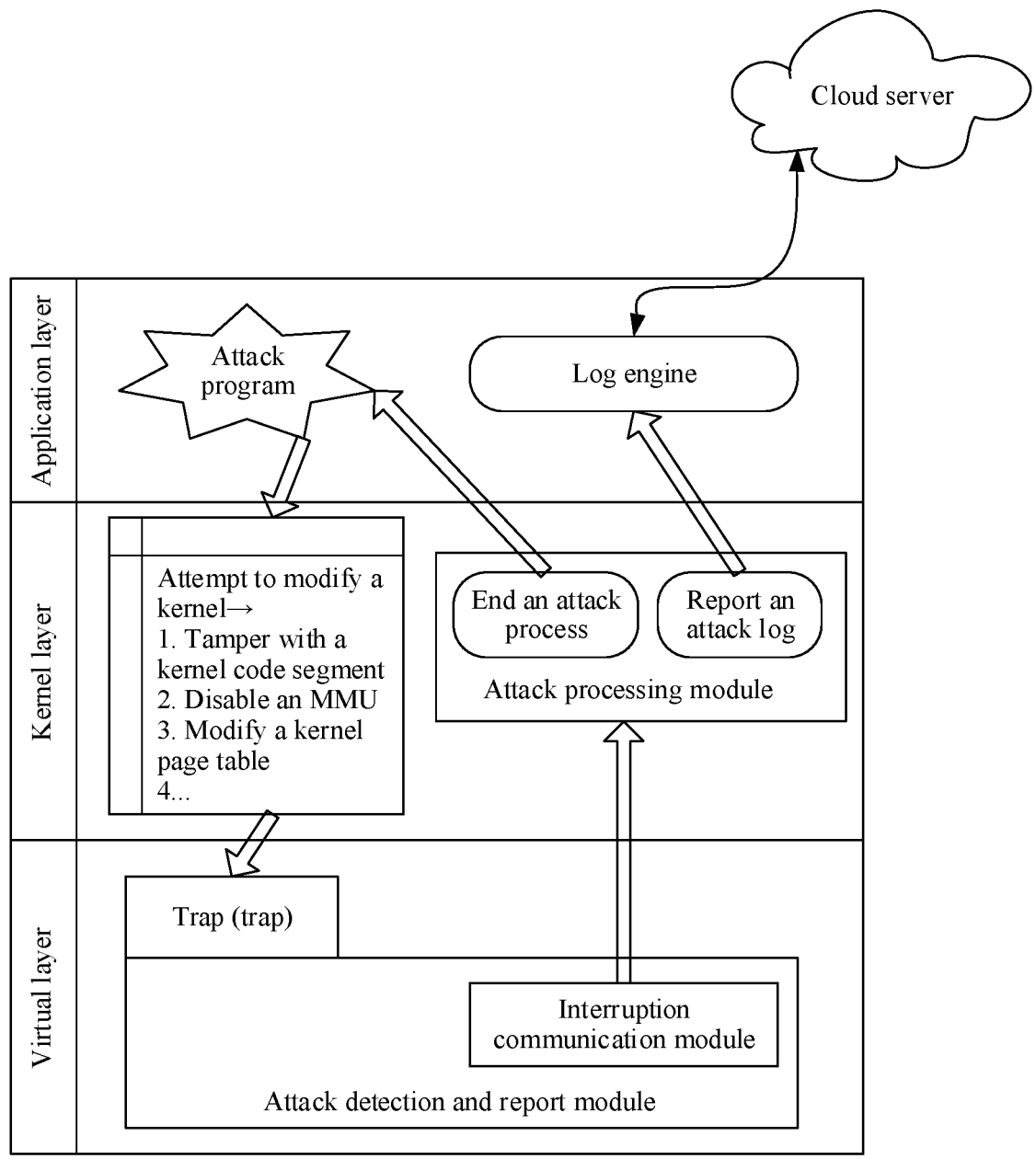
FIG. 5 is a schematic diagram of execution of a kernel integrity protection method according to an embodiment of the present invention.

FIG. 5 is a schematic diagram of execution of a kernel integrity protection method according to an embodiment of the present invention. In this embodiment, a virtual layer detects an attack event that occurs in a kernel layer, and reports the attack event to the kernel layer, and the kernel layer processes the attack event. Referring to FIG. 5, a virtual memory monitoring switch (for example, HCR_EL2 for a processor ARMv8) is turned on to monitor reading/writing a specific register, so as to prevent malicious tampering. A corresponding memory trap (trap) is set to perform validity check on some fuzzy memory access. Modules such as register monitoring, system control register protection, kernel code segment protection, kernel page table protection, user page table protection are included in a design. When the kernel layer is attacked, the kernel layer traps (trap) in the virtual layer. An attack detection and report module captures the attack event in the kernel layer, and then sends information such as an attack type, a name of an attack process, and a process ID (ProcessID, PID) to an attack processing module in the kernel layer by using an interruption communication module. It may be understood that the interruption communication module may further report different additional information for different attack types, for example, the different attack types such as modifying a code segment and attempting to modify an address may have different additional information. After receiving interruption, the attack processing module reads the attack event information reported by the virtual layer by using the interruption communication module, and sends a signal to an attack process, to attempt to end the attack process. Finally, the attack processing module reports an attack log to a log engine module, the log engine module records the attack log, and uploads the attack log to a cloud server for big data statistics analysis. The cloud server delivers a new security policy or a new patch based on an analysis result, to enhance device security. A trap (trap) is a normal execution process for a program. When a processor detects some exception events, the processor suspends a current execution process, changes a processor mode, and switches to an address to execute response code.

Figure 6:
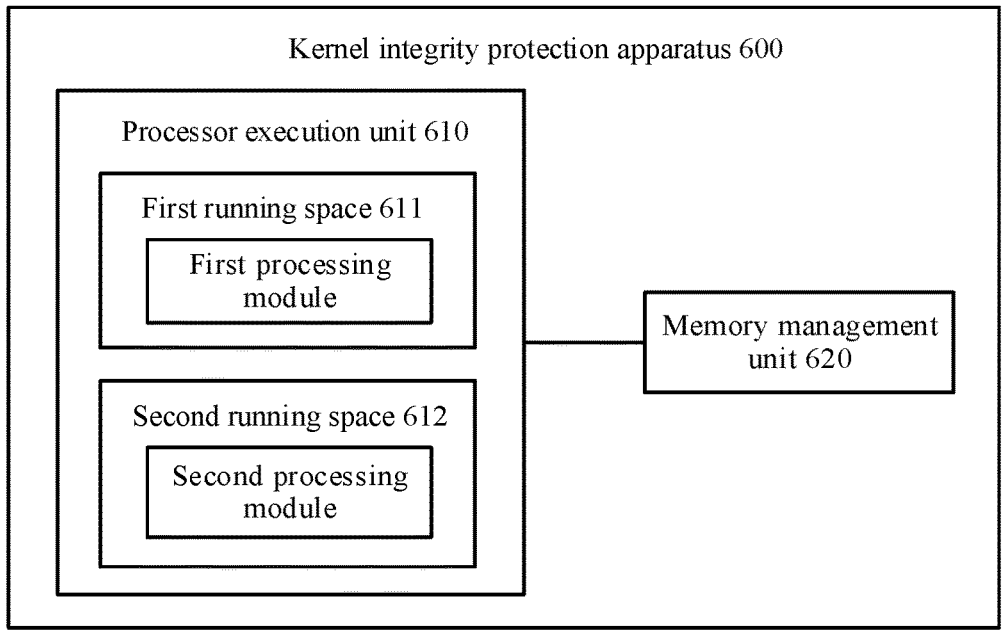
FIG. 6 is a schematic structural diagram of another kernel integrity protection apparatus according to an embodiment of the present invention.

FIG. 6 is a schematic structural diagram of a kernel integrity protection apparatus according to an embodiment of this application. It should be understood that the kernel integrity protection apparatus 600 shown in FIG. 6 is merely an example. The kernel integrity protection apparatus in this embodiment of this application may further include other modules or units, modules having functions similar to functions of modules in FIG. 6, or not necessarily include all the modules in FIG. 6.

The kernel integrity protection apparatus 600 includes a processor execution unit 610 and a memory management unit 620. A running space divided by the processor execution unit 610 includes a first running space 611 and a second running space 612, an exception level of the second running space 612 is higher than an exception level of the first running space 611, a first processing module runs in the first running space 611, and a second processing module runs in the second running space 612.

The kernel integrity protection apparatus 600 may be configured to perform the step performed by the kernel integrity protection apparatus in the kernel integrity protection method shown in FIG. 4 or FIG. 5.

For example, the first processing module is configured to send a request message to the second processing module, where the request message is used to request to perform memory access, and the memory access relates to preset register access and/or preset memory space access, and
the second processing module is configured to: in response to the request message, obtain information about an event corresponding to the memory access, and send the information to the first processing module running in the first running space 611; where
the first processing module is further configured to process the event based on the information.

Optionally, in an embodiment, the first running space 611 is kernel space, the first processing module is an operating system, and the second running space 612 is super management space or security monitoring space.

Optionally, in an embodiment, that the first processing module is configured to request the preset register access includes:
reading or writing a system control register.

Optionally, in an embodiment, that the first processing module is configured to request the preset memory space access includes:
at least one of modifying a kernel code segment, disabling the memory management unit 620, modifying a kernel page table, and modifying a user page table.

Optionally, in an embodiment, the running space divided by the processor execution unit 610 further includes a third running space, an exception level of the third running space is lower than the exception level of the first running space, and a third processing module runs in the third running space, and
the first processing module is specifically configured to send a signal to the third processing module based on the attack information, where the signal is used to end a process corresponding to the event.

Optionally, in an embodiment, the running space divided by the processor execution unit 610 further includes a third running space, an exception level of the third running space is lower than the exception level of the first running space 611, and a fourth processing module runs in the third running space, and
the first processing module is specifically configured to report a log to the fourth processing module based on the information, where the log includes the information.

Optionally, in an embodiment, the fourth processing module is further configured to: upload the log to a cloud server; and receive a security policy or a patch from the cloud server.

Optionally, in an embodiment, the third running space is user program space.

Optionally, in an embodiment, the information includes at least one of an attack type, a name of an attack process, and a port number.

Optionally, in an embodiment, the apparatus 600 is specifically a data protection apparatus, and the data protection apparatus includes the processor execution unit 610 and the memory management unit 620, and
the first processing module is specifically configured to send a first message to the memory management unit 620, where the first message is used to request to modify an attribute of a first memory;
the memory management unit 620 is configured to send a second message to the second processing module, where the second message is used to request to determine whether the first memory is protected;

the second processing module is specifically configured to determine, based on a pre-obtained memory protection table, whether the first memory is protected; where the second processing module is further configured to send a third message to the memory management unit, where the third message is used to indicate whether to modify the attribute of the first memory; and the memory management unit 620 is further configured to: when the third message is used to instruct to modify the attribute of the first memory, modify the attribute of the first memory based on the first message; and when the third message is used to instruct not to modify the attribute of the first memory, reject modifying the attribute of the first memory.

Optionally, in an embodiment, the first processing module is further configured to send a fourth message to the second processing module in the second running space 612, where the fourth message is used to indicate whether the first memory is protected, and before determining, based on the pre-obtained memory protection table, whether the first memory is protected, the second processing module is further configured to generate the memory protection table based on the fourth message, where the memory protection table is used to record a protected memory and/or an unprotected memory, the protected memory includes a memory configured to store protected data, and the unprotected memory includes a memory configured to store unprotected data.

Optionally, in an embodiment, before determining, based on the pre-obtained memory protection table, whether the first memory is protected, the second processing module is further configured to:

determine that the first memory is configured to store protected data or determine that the first memory is configured to store unprotected data; and generate the memory protection table, where the memory protection table is used to record that the first memory is a protected memory or is used to record that the first memory is an unprotected memory, the protected memory includes a memory configured to store the protected data, and the unprotected memory includes a memory configured to store the unprotected data.

Optionally, in an embodiment, the first running space 611 is kernel space, and the first processing module is an operating system, and the protected data includes: constant data written by the operating system into a memory in a compilation phase, and constant data written by the operating system into the memory in an initialization phase.

Optionally, in an embodiment, the data protection apparatus 600 is a mobile phone, a tablet computer, a server, a personal computer, a network router, or a switch.

In this embodiment of the present invention, the exception level of the second running space 612 is higher than the exception level of the first running space 611, and the first processing module in the first running space 611 needs to be authorized by the second processing module in the second running space 612 when the first processing module in the first running space 611 needs to perform specific memory access. Therefore, the first processing module in the first running space 611 cannot randomly perform the register and/or the memory space access. When the second processing module running in the second running space 612 determines that a check result is that the memory access is invalid, the second processing module running in the second running space 612 further instructs the first processing module running in the first running space 611 to process the attack event, to dynamically measure kernel integrity and terminate an intrusion in real time. This ensures higher security.

In the following embodiments, the kernel integrity protection method is specifically a data protection method, and the kernel integrity protection apparatus is specifically a data protection apparatus.

Figure 7:
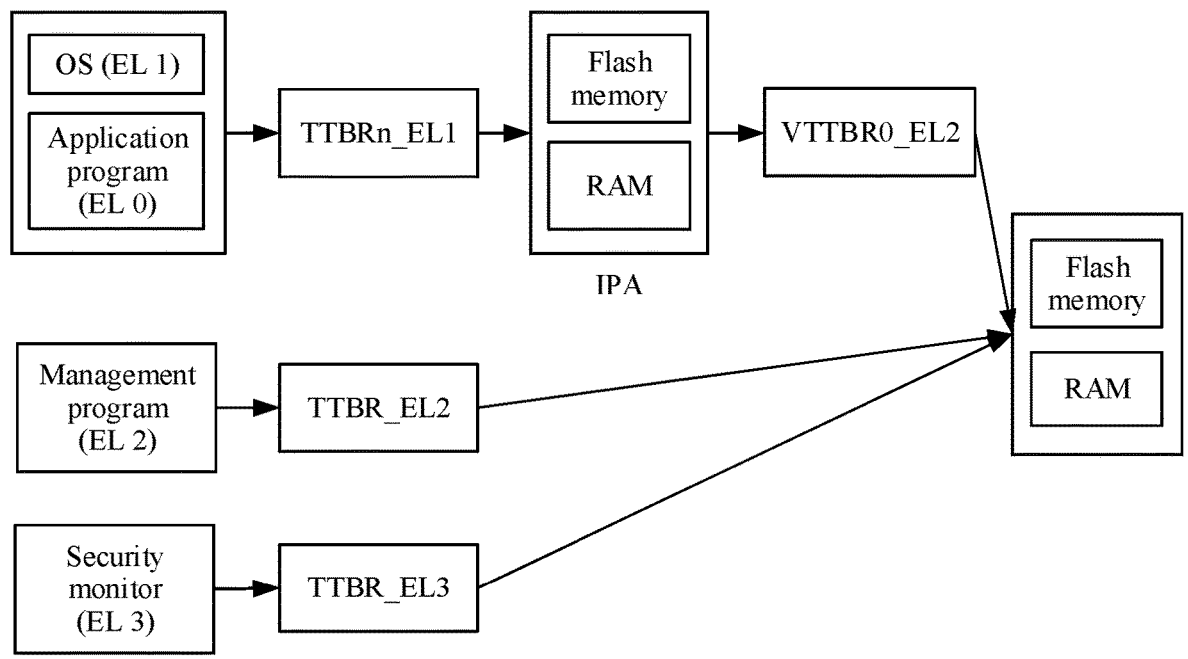
FIG. 7 is a schematic flowchart of address mapping performed by an MMU according to an embodiment of this application.

For example, as shown in FIG. 7, an MMU performs a two-phase address mapping procedure for an application program whose exception level is an EL 0 and an operating system whose exception level is an EL 1, and performs a one-phase address mapping procedure for a management program whose exception level is an EL 3 and a security monitor whose exception level is an EL 4.

In the two-phase address mapping procedure, in a phase 1, a virtual address (virtual address, VA) of a memory is converted into an intermediate physical address (immediate physical address, IPA); and in a phase 2, the IPA is converted into a physical address (physical address, PA).

In the phase 1 of the address conversion, an example of a translation table base register (translation table base registers, TTBR) used by the MMU is TTBRn_EL1. In the phase 2 of the address conversion, a base address of a translation table used by the MMU is specified in a virtualization translation table base register (virtualization translation table base register, VTTBR) 0_EL2. For example, a continuous address space at the bottom of a memory is specified in the VTTBR0_EL2 as the base address of the translation table.

In the one-phase address mapping procedure, the MMU can directly obtain the PA based on the VA. The management program EL 2 and the security supervisor EL 3 each has a one-phase translation table belong to the management program EL 2 and the security supervisor EL 3. The management program EL 2 and the security supervisor EL 3 can directly convert from the virtual address into the physical address by using the table corresponding to each of the management program EL 2 and the security supervisor EL 3. A base address of the translation table corresponding to the management program EL 2 is specified in the TTNR0_EL 2, and a base address of the translation table corresponding to the security supervisor EL 3 is specified in a TTNR0_EL3. A continuous address space with a variable size at the bottom of a memory is specified in each of the two registers as the base address of the translation address table of the management program EL 2 and the base address of the translation address table of the security supervisor EL 3.

It should be understood that the foregoing TTBRn_EL1, TTNR0_EL2, and TTNR0_EL3 are merely examples, and different names may be referenced in different documents.

In the two-phase address mapping procedure, the phase 1 is usually performed under control of the operating system, and the phase 2 is usually performed under control of the management program.

The performing under the control of the management program described herein may be understood as: only when the management program determines that the VA corresponding to the IPA can access, the management program authorizes the MMU to perform the conversion from the IPA to the PA.

The data protection method in this embodiment of this application is mainly implemented under the control of the management program in the phase-2 of the address mapping procedure. Specifically, a memory protection table is pre-stored in a computer, where the memory protection table records address information of a memory that needs to be protected and/or a memory that does not need to be protected, and a processing module is added to the management program, where the processing module is used to query the memory protection table whether address information of a memory whose access attribute is requested by the operating system or the application program to modify is included, and if the processing module determines, after querying the memory protection table, that the memory whose access attribute is requested to modify is the protected memory, the processing module rejects the MMU modifying the access attribute of the memory.

An example of the memory protection table is shown in Table 1. Table 1 records both the protected memory and the unprotected memory. The first column records a virtual address of the protected memory, and the second column records a virtual address of the unprotected memory.

TABLE 1

Memory protection table

| Virtual address of a protected memory | Virtual address of an unprotected memory |
| --- | --- |
| 0x40000000-0x60000000 | 0x00000000-0x30000000 |

For example, after malware is downloaded on the computer or a malicious plug-in is carried in a browsed web page, the malware or the malicious plug-in attacks the operating system, obtains management permission on the operating system, and controls the operating system to modify the access attribute of the memory whose virtual address is from 0x41115000 to 0x41116000 from writable to read-only, so that when the malware or the malicious plug-in modifies data in the memory, in a process of the MMU performing the phase 2 mapping on the address of the memory, the management program queries the memory protection table to learn of that the memory is protected, thereby rejecting the MMU performing the phase 2 address mapping procedure, namely, rejecting the attack from the malware or the malicious plug-in, and protecting the data in the memory.

Optionally, after rejecting the malware or the malicious plug-in modifying the access attribute of the memory, the management program may further send prompt message indicating that the protected memory is attacked, for example, pop up a display box or send an alert sound.

Figure 8:
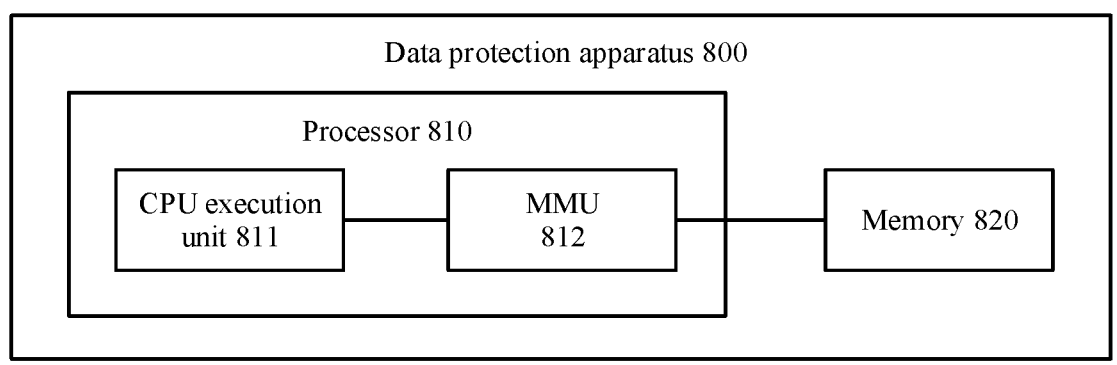
FIG. 8 is a schematic structural diagram of a data protection apparatus according to another embodiment of this application.

The following uses a data protection apparatus 800 shown in FIG. 8 as an example to describe the data protection method provided in this application. It should be understood that the data protection apparatus 800 shown in FIG. 8 is merely an example. The data protection apparatus in this embodiment of this application may further include other modules or units, modules having functions similar to functions of modules in FIG. 8, or not necessarily include all the modules in FIG. 8.

The data protection apparatus 800 shown in FIG. 8 includes a processor 810 and a memory 820. The memory may exchange data with the processor 810.

An example of the memory 820 is a random access memory (random access memory, RAM). The RAM may also be referred to as a main memory or a memory. Another example of the memory 820 is a flash (Flash) memory. It should be understood that a memory in the following embodiments may be replaced with the flash memory.

An example of the processor 810 is a central processing unit (central processing unit, CPU). The CPU may also be referred to as a central processing unit.

The processor 810 may include a CPU execution unit 811 and a memory management unit 812. It should be understood that, that the MMU is integrated into the processor 810 is merely an example. The MMU may alternatively be located outside the processor 810.

Figure 9:
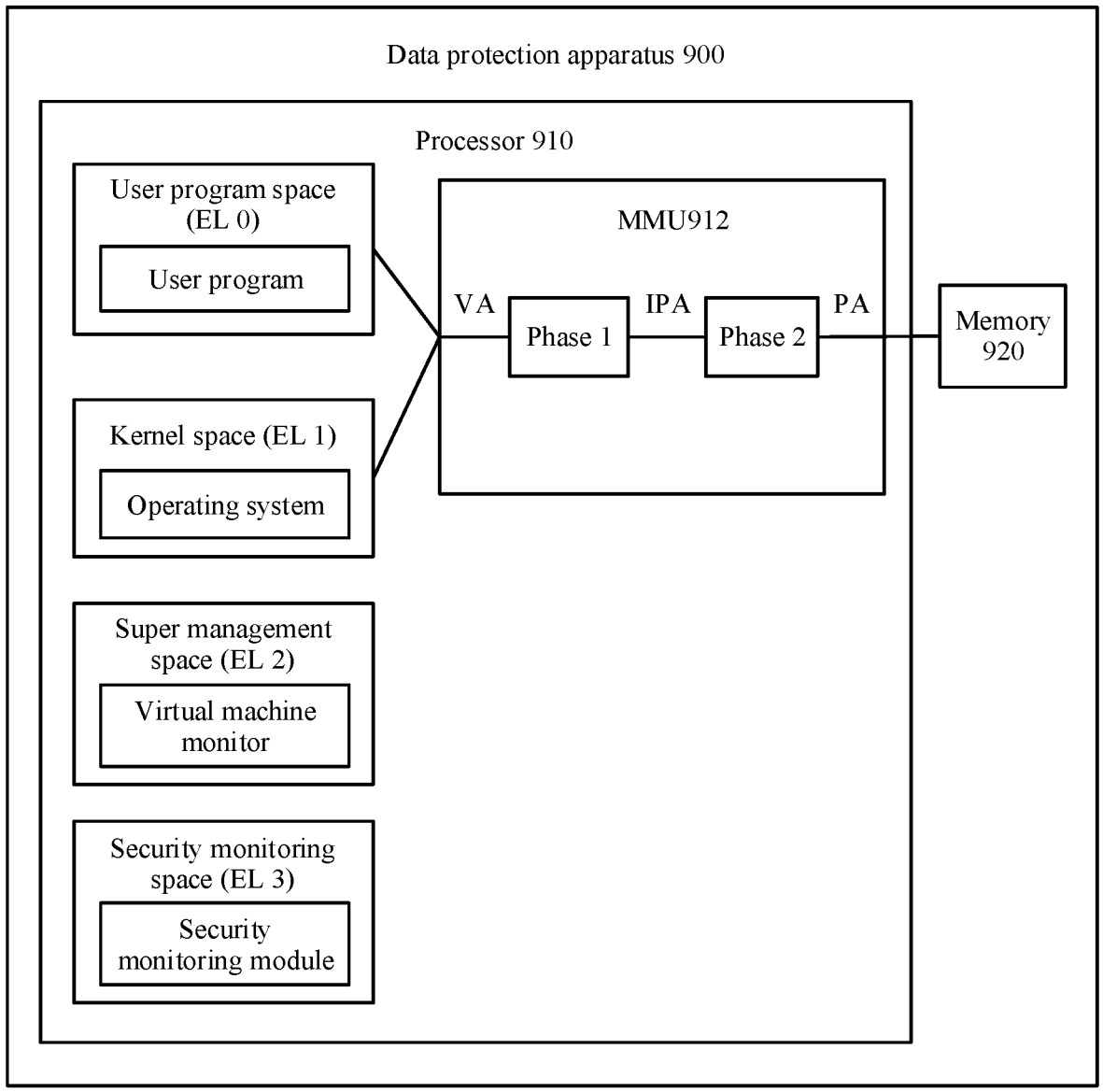
FIG. 9 is a schematic structural diagram of a data protection apparatus according to another embodiment of this application.

As shown in FIG. 9, four exception levels (exception level, EL) are defined for the processor 810, or in other words, program code executed by the CPU execution unit 811 may be classified into four exception levels. The four exception levels are an EL 0, an EL 1, an EL 2, and an EL 3 in ascending order. The EL 0, the EL 1, the EL 2, and the EL 3 correspond to four running spaces.

A running space corresponding to the EL 0 is user program space, and a user program runs in the user program space. The user program may also be referred to as an application program.

A running space corresponding to the EL 1 is kernel (kernel) space, and an operating system (operating system, OS) runs in the kernel space. The operating system running in the kernel space may also be referred to as a client (guest) operating system.

A running space corresponding to the EL 2 is super management space. A management program (hypervisor) runs in the super management space. The hypervisor may also be referred to as a virtual machine monitor (virtual machine monitor). The hypervisor is an intermediate software layer running between physical hardware and the operating system, and can allow a plurality of operating systems and application programs to share one piece of basic physical hardware.

From the perspective of system security, main functions of the hypervisor are memory management and interruption interception. In the two manners, the hypervisor can monitor running of the operating system in the kernel space.

The hypervisor can implement the memory management by using a two-phase (stage 2) memory mapping function of the MMU 812. The MMU 812 can implement the memory management by using a technology such as a shadow page table or an EPT page table.

As shown in FIG. 9, after receiving a VA sent from the user program space or the kernel space, the MMU 812 can map, in a phase 1 (stage-1), the address sent by the operating system in the kernel space or the user program in the user program space to an intermediate physical address; and in a phase 2 (stage-2), the MMU 812 can map the IPA to an address of a memory chip.

The address sent by the operating system in the kernel space or the user program in the user program space may be referred to as the virtual address, or the address visible to the operating system or the user program is the VA. An actual address of the memory chip is referred to as a physical address. An address used in a process in which the VA is mapped to the PA may be referred to as the IPA.

It should be noted that the stage-2 memory mapping function is valid only for the operating system running in the kernel space and the user program in the user program space. In other words, the stage-2 memory mapping function needs to be used only when the operating system running in the kernel space and the user program in the user program space perform memory access.

Implementation of the two-phase memory mapping function of the MMU 812 described above is merely an example. For the implementation of the two-phase memory mapping function of the MMU 812, refer to the prior art. Details are not described herein.

The memory has an access permission attribute. For ease of description, in this embodiment of this application, the access permission attribute of the memory is referred to as an attribute of the memory for short.

The attributes of the memory may include read-only, writable, inaccessible, and executable. That the attribute of the memory is read-only means that content in the memory can be read only, and the content in the memory cannot be modified. That the attribute of the memory is writable means that the content in the memory can be read, and the content in the memory can also be modified.

After receiving the address sent by the operating system in the kernel space or the user program in the user program space, the MMU 812 can gain access to, based on the attribute of the memory corresponding to the address, the content in the memory corresponding to the address.

For example, if the operating system in the kernel space or the user program in the user program space requests the MMU 812 to write data into a memory corresponding to an address, and an attribute of the memory corresponding to the address is writable, the MMU 812 maps the address to a physical address of the memory, and then sends the physical address to the address bus, so that the data is written into the memory.

For example, if the operating system in the kernel space or the user program in the user program space requests the MMU 812 to write the data into the memory corresponding to the address, but the attribute of the memory corresponding to the address is read-only, the MMU 812 rejects the request. An example of the MMU 812 rejecting the request is providing an exception prompt message.

In the data protection apparatus 800, the operating system running in the kernel space may invoke the hypervisor by using a super management call (hypervisor call, HVC) instruction.

A security monitoring module of the processor runs in security monitoring (secure monitor) space corresponding to the EL 4.

It should be understood that division into the running space in the processor shown in FIG. 9 is merely an example. More or fewer running spaces may be divided in the processor. This is not limited in this application.

The data protection method provided in this application mainly includes: when program code running in a running space of a low exception level requests to modify the attribute of a memory, program code running in a running space of a high exception level captures the request, and determines whether the memory is a protected memory, and if the memory is the protected memory, the program code running in the running space of the high exception level rejects this modification.

Figure 10:
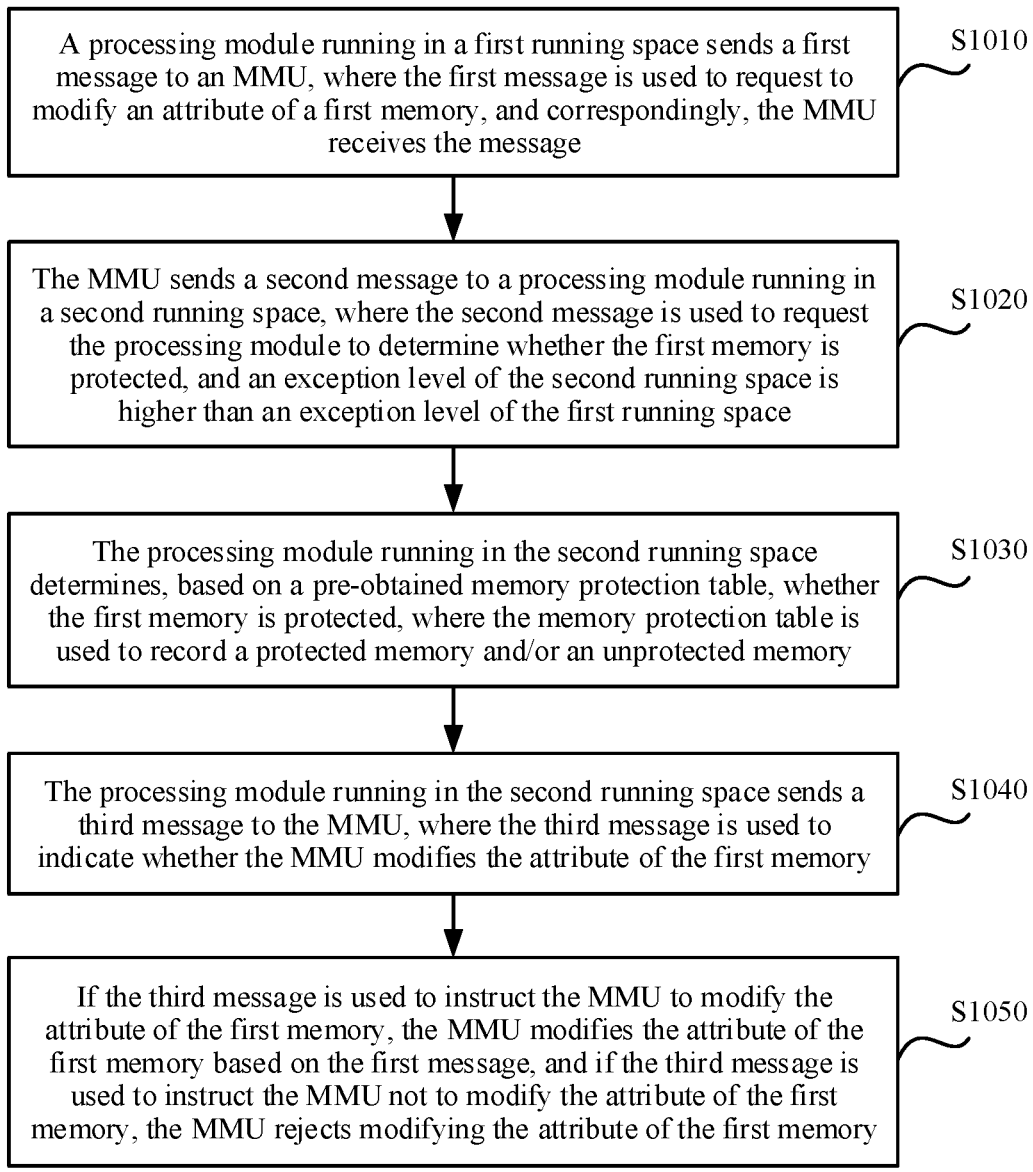
FIG. 10 is a schematic flowchart of a data protection method according to an embodiment of this application.

FIG. 10 is a schematic flowchart of a data protection method according to an embodiment of this application. The data protection method may be performed by the data protection apparatus 800. The data protection method shown in FIG. 10 includes steps S1010, S1020, S1030, S1040, and S1050.

It should be understood that FIG. 10 shows steps or operations of the data protection method, but these steps or operations are merely examples. In this embodiment of this application, other operations or variants of the operations in FIG. 10 may alternatively be performed. In addition, the steps in FIG. 10 may be performed in a sequence different from that shown in FIG. 10, and possibly, not all the operations in FIG. 10 need to be performed.

S1010. A processing module running in a first running space sends a first message to an MMU, where the first message is used to request to modify an attribute of a first memory, and correspondingly, the MMU receives the message.

For ease of description, the processing module running in the first running space may be referred to as a first processing module. The first memory is a memory whose attribute is requested to modify in the first message.

The first running space may be the user program space or the kernel space shown in FIG. 9. When the first running space is the user program space, the first processing module may be a user program. When the first running space is the kernel space, the first processing module may be an operating system.

The first message may include a VA of the first memory and a target attribute of the first memory. That is, the first message is used to request the MMU to modify the attribute of the first memory to the target attribute. The target attribute of the first memory may include at least one of read-only, writable, executable, and inaccessible.

An example of the first message that is used to request to modify the target attribute of the first memory to be writable is set_memory_RW, and an example of the first message that is used to request to modify the target attribute of the first memory to read-only is set_memory_RO.

S1020. The MMU sends a second message to a processing module running in a second running space, where the second message is used to request the processing module to determine whether the first memory is protected, and an exception level of the second running space is higher than an exception level of the first running space. Correspondingly, the processing module running in the second running space receives the second message.

For ease of description, the processing module running in the second running space may be referred to as a second processing module or a kernel critical data protection (kernel critical data protection) module. The second processing module or the kernel critical data protection module may be a processing module in a hypervisor.

The second running space may be the super management space shown in FIG. 9.

Optionally, the second message may also be understood as a request for the second processing module to determine whether the attribute of the first memory can be modified, or may be understood as a request for the second processing module to determine whether data in the first memory is protected.

The second message may include an address of the first memory. For example, the second message may include a VA of the first memory.

Optionally, information included in the second message may be the same as information included in the first message.

S1030. The processing module running in the second running space determines, based on a pre-obtained memory protection table, whether the first memory is protected, where the memory protection table is used to record a protected memory and/or an unprotected memory.

The protected memory may be understood as storing protected data. The protected data may include at least one type of the following data: constant data of the operating system, and data that is generated in a running process of the operating system and that needs to be protected. The constant data of the operating system may include at least one type of the following data: constant data that appears in a compilation phase of the operating system, and constant data that appears in an initialization phase of the operating system.

From another perspective, an explanation of the protected memory may include: attributes of the memory cannot be modified from any one of read-only, inaccessible, and executable to writable; and an explanation of the unprotected memory may include: attributes of the memory may be modified from any attribute to any other attribute.

An implementation for the memory protection table to record the protected memory and/or the unprotected memory may include: the memory protection table records an address of the protected memory and/or an address of the unprotected memory.

For example, the memory protection table may record a VA address of the protected memory and/or a VA address of the unprotected memory.

In a possible implementation, the memory protection table may record only the protected memory. In this implementation, that the processing module running in the second running space determines, based on the pre-obtained memory protection table, whether the first memory is protected may include: if the protected memory recorded in the memory protection table includes the first memory, the processing module running in the second running space determines that the first memory is protected, and if the protected memory recorded in the memory protection does not include the first memory, the processing module running in the second running space determines that the first memory is unprotected.

In a possible implementation, the memory protection table may record only the unprotected memory. This implementation is summarized. That the processing module running in the second running space determines, based on the pre-obtained memory protection table, whether the first memory is protected may include: if the unprotected memory recorded in the memory protection table does not include the first memory, the processing module running in the second running space determines that the first memory is protected, and if the unprotected memory recorded in the memory protection includes the first memory, the processing module running in the second running space determines that the first memory is unprotected.

In a possible implementation, the memory protection table may record both the protected memory and the unprotected memory. In this implementation, that the processing module running in the second running space determines, based on the pre-obtained memory protection table, whether the first memory is protected may include: if the protected memory recorded in the memory protection table includes the first memory, the processing module running in the second running space determines that the first memory is protected, and if the unprotected memory recorded in the memory protection does not include the first memory, the processing module running in the second running space determines that the first memory is unprotected.

S1040. The processing module running in the second running space sends a third message to the MMU, where the third message is used to indicate whether the MMU modifies the attribute of the first memory. Correspondingly, the MMU receives the third message.

For example, in step S1030, if the second processing module determines that the first memory is unprotected, the third message is used to instruct the MMU to modify the attribute of the first memory, and if the second processing module determines that the first memory is protected, the third message is used to instruct the MMU not to modify the attribute of the first memory.

S1050. If the third message is used to instruct the MMU to modify the attribute of the first memory, the MMU modifies the attribute of the first memory based on the first message, and if the third message is used to instruct the MMU not to modify the attribute of the first memory, the MMU rejects modifying the attribute of the first memory.

For example, if the third message is used to instruct the MMU to modify the attribute of the first memory, and the first message includes the address of the first memory and the target attribute of the first memory, the MMU modifies the attribute of the first memory to the target attribute.

For example, if the third message is used to instruct the MMU not to modify the attribute of the first memory, the MMU may return an exception operation prompt message to the first processing module.

In the data protection method shown in FIG. 10, a processing module running in a running space of a lower exception level cannot modify code logic and a function in a running space of a higher exception level. Therefore, when permission on the processing module in the running space of the lower exception level is obtained by malware or an external apparatus, important data that needs to be protected can still be protected, thereby improving data security.

For example, even if administrator permission on and an account of the operating system are obtained by the malware, the important data in the operating system can still be protected, so that data security in the operating system can be improved.

Figure 11:
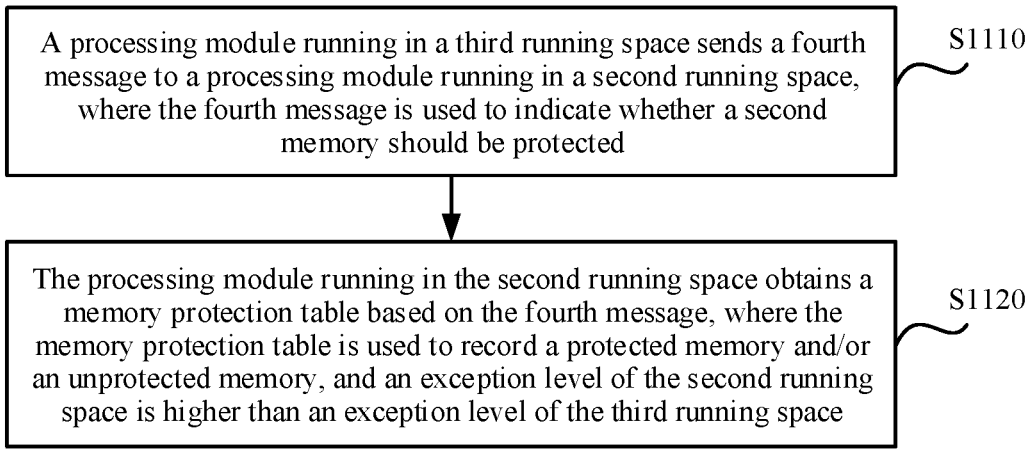
FIG. 11 is a schematic flowchart of a data protection method according to another embodiment of this application.

In another embodiment of this application, a schematic flowchart of a method for assisting in protecting data is shown in FIG. 11. The method shown in FIG. 11 may include steps S1110 and S1120. The method may be performed by the data protection apparatus 800.

It should be understood that FIG. 11 shows steps or operations of the method, but these steps or operations are merely examples. In this embodiment of this application, other operations or variants of the operations in FIG. 11 may alternatively be performed. In addition, the steps in FIG. 11 may be performed in a sequence different from that shown in FIG. 11, and possibly, not all the operations in FIG. 11 need to be performed.

S1110. A processing module running in a third running space sends a fourth message to a processing module running in a second running space, where the fourth message is used to indicate whether a second memory should be protected. Correspondingly, the processing module in the second running space receives the fourth message.

The third running space may be the user program space or the kernel space shown in FIG. 9. The second running space may be the super management space shown in FIG. 9.

Optionally, the third running space and the first running space may be a same running space. The processing module running in the second running space may be a second processing module or a kernel critical data protection module.

The fourth message may also be understood as being used to indicate that data stored in the second memory should be protected, or may be understood as being used to indicate that an attribute of the second memory cannot be modified from any one of read-only, executable, or inaccessible to writable, or may be understood as being used to indicate that data stored in the second memory should not be modified.

The data that should be protected or should not be modified may include at least one type of the following data: constant data that is stored in a memory by an operating system in a compilation phase, constant data that is stored in the memory by the operating system in an initialization phase, and data that is stored in the memory by the operating system or a user program in a running phase and that cannot be modified.

The fourth message may include an address of the second memory. For example, the fourth message may include a VA of the second memory.

In a possible implementation, that the processing module running in the third running space sends the fourth message to the processing module running in the second running space may include: the processing module running in the third running space invokes the processing module running in the second running space, and transfers, during the invoking, the fourth message to the processing module running in the second running space through an interface.

For example, the operating system running in the kernel space may invoke, by using an HVC instruction, a hypervisor running in the super management space, so that the hypervisor generates a memory protection table based on the fourth message.

S1120. The processing module running in the second running space obtains the memory protection table based on the fourth message, where the memory protection table is used to record a protected memory and/or an unprotected memory, and an exception level of the second running space is higher than an exception level of the third running space.

For example, when the memory protection table is only used to record the protected memory, if the fourth message is used to indicate that the second memory should be protected, the processing module running in the second running space may record the second memory into the memory protection table, and if the fourth message is used to indicate that the second memory should not be protected, the processing module running in the second running space does not record the second memory into the memory protection table.

For example, when the memory protection table is only used to record the unprotected memory, if the fourth message is used to indicate that the second memory should not be protected, the processing module running in the second running space may record the second memory into the memory protection table, and if the fourth message is used to indicate that the second memory should be protected, the processing module running in the second running space does not record the second memory into the memory protection table.

For example, when the memory protection table is used to record both the protected memory and the unprotected memory, if the fourth message is used to indicate that the second memory should be protected, the processing module running in the second running space may record the second memory into the memory protection table, and mark the second memory as the protected memory, and if the fourth message is used to indicate that the second memory should not be protected, the processing module running in the second running space may record the second memory into the memory protection table, and mark the second memory as the unprotected memory.

In an example of this embodiment of this application, after the operating system writes the constant data into the memory in the compilation phase, and marks the attribute of the memory as read-only, the operating system invokes the hypervisor by using the HVC instruction, and records the memory as the protected memory.

In another example of this embodiment of this application, after the operating system writes the constant data into the memory in the initialization phase, and marks the attribute of the memory as read-only, the operating system invokes the hypervisor by using the HVC therapy, and records the memory as the protected memory.

In another example of this embodiment of this application, after the operating system writes the data into the memory in the running phase, and marks the attribute of the memory as read-only, the operating system invokes the hypervisor by using the HVC therapy, and records the memory as the protected memory.

In an embodiment of this application, the memory protection table used in step S1030 may be obtained by using the method shown in FIG. 11. In other words, the memory protection table used in step S1030 may be the memory protection table obtained in step S1120.

When the memory protection table used in step S1030 is the memory protection table obtained in step S1120, the second memory and the first memory may be a same memory, and the third running space and the first running space may be a same running space, or may be different running spaces.

When the third running space and the first running space are the same running space, the processing module running in the third running space and the first processing module may be a same processing module. For example, when the first running space and the third running space are kernel spaces, the processing module running in the third running space and the first processing module space are operating systems.

For example, after the operating system writes the constant data into the first memory in the compilation phase, writes the constant data into the first memory in the initialization phase, or writes the data into the first memory in the running phase, and marks the attribute of the first memory as read-only, the operating system may invoke the hypervisor by using the HVC instruction, and record the first memory as the protected memory in the memory protection table. In this way, when the operating system sends a first message to an MMU to request to modify the attribute of the first memory, the MMU may send a second message to the hypervisor, to request the hypervisor to determine whether the first memory is protected. Because the memory protection table records that the first memory is the protected memory, the hypervisor instructs the MMU that the attribute of the first memory cannot be modified.

An example in which the third running space and the first running space are different running spaces is: the first running space is user program space, the third running space is kernel space, the first processing module is an operating system, and the processing module in the third running space is a user program.

Figure 12:
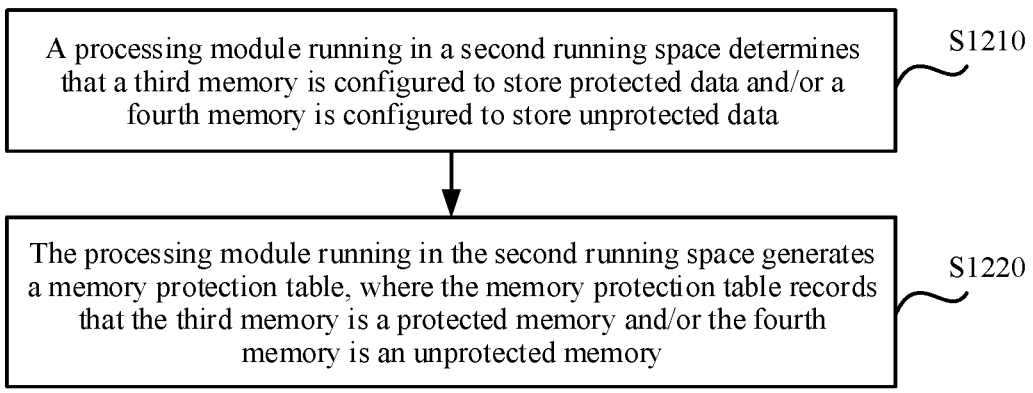
FIG. 12 is a schematic flowchart of a data protection method according to another embodiment of this application.

In still another embodiment of this application, a schematic flowchart of a method for assisting in protecting data is shown in FIG. 12. The method shown in FIG. 12 may include steps S1210 and S1220. The method may be performed by the data protection apparatus 800.

It should be understood that FIG. 12 shows steps or operations of the method, but these steps or operations are merely examples. In this embodiment of this application, other operations or variants of the operations in FIG. 12 may alternatively be performed. In addition, the steps in FIG. 12 may be performed in a sequence different from that shown in FIG. 12, and possibly, not all the operations in FIG. 12 need to be performed.

S1210. A processing module running in a second running space determines that a third memory is configured to store protected data and/or a fourth memory is configured to store unprotected data.

Or in other words, the processing module running in the second running space determines which memory is configured to store the protected data and/or determines which memory is configured to store the unprotected data. The memory configured to store the protected data is the third memory, and the memory configured to store the unprotected data is the fourth memory.

The second running space may be the super management space shown in FIG. 9.

The protected data may include at least one type of the following data: constant data that is stored in a memory by an operating system in a compilation phase, constant data that is stored in the memory by the operating system in an initialization phase, and data that is stored in the memory by the operating system or a user program in a running phase and that cannot be modified.

Optionally, the third memory and/or the fourth memory may be determined by the processing module running in the second running space based on pre-configured information, where the pre-configured information records that the third memory is configured to store the protected data and/or the fourth memory is configured to store the unprotected data.

Or in other words, the pre-configured information records which memory is configured to store the protected data, and/or records which memory is configured to store the unprotected data.

For example, the data protection apparatus 800 may pre-allocate, to the operating system in the kernel space, a memory configured to store the constant data of the operating system. Because the constant data of the operating system is data that needs to be protected, information that the memory is the third memory may be pre-configured. In this way, the processing module running in the second running space may determine, based on the pre-configured information, that the third memory is configured to store the protected data.

For example, the pre-configured information may record a VA of the memory allocated to the constant data of the operating system. In this way, the processing module running in the second running space may determine, based on the pre-configured information, that the memory corresponding to the VA is configured to store the protected data, that is, the memory is the third memory.

S1220. The processing module running in the second running space generates a memory protection table, where the memory protection table records that the third memory is a protected memory and/or the fourth memory is an unprotected memory.

For example, after determining that the third memory is the memory configured to store the protected data, the processing module running in the second running space records the third memory into the memory protection table, and marks the third memory as the protected memory.

For example, after determining that the fourth memory is the memory configured to store the unprotected data, the processing module running in the second running space records the fourth memory into the memory protection table, and marks the fourth memory as the unprotected memory.

In an embodiment of this application, the memory protection table used in step S1030 may be obtained by using the method shown in FIG. 12. In other words, the memory protection table used in step S1030 may be the memory protection table obtained in step S1220.

When the memory protection table used in step S1030 is the memory protection table obtained in step S1220, the third memory and the first memory may be a same memory, or the fourth memory and the first memory may be a same memory.

For example, after the operating system in the compilation phase writes the constant data into the third memory originally allocated to the constant data, and the operating system marks an attribute of the third memory as read-only, a hypervisor may record the third memory as the protected memory in the memory protection table. In this way, when the operating system sends a first message to an MMU to request to modify the attribute of the third memory, the MMU may send a second message to the hypervisor, to request the hypervisor to determine whether the third memory is protected. Because the memory protection table records that the third memory is the protected memory, the hypervisor instructs the MMU that the attribute of the third memory cannot be modified.

Figure 13:
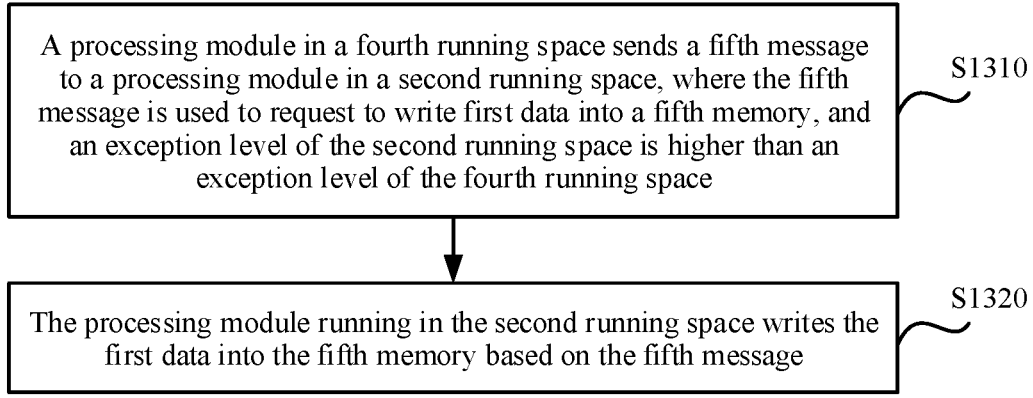
FIG. 13 is a schematic flowchart of a data protection method according to another embodiment of this application.

FIG. 13 is a schematic flowchart of a data protection method according to an embodiment of this application. The data protection method includes steps S1310 and S1320.

It should be understood that FIG. 13 shows steps or operations of the data protection method, but these steps or operations are merely examples. In this embodiment of this application, other operations or variants of the operations in FIG. 13 may alternatively be performed. In addition, the steps in FIG. 13 may be performed in a sequence different from that shown in FIG. 13, and possibly, not all the operations in FIG. 13 need to be performed.

S1310. A processing module in a fourth running space sends a fifth message to a processing module in a second running space, where the fifth message is used to request to write first data into a fifth memory, and an exception level of the second running space is higher than an exception level of the fourth running space.

The fourth running space may be the user program space or the kernel space shown in FIG. 9, and the second running space may be the super management space shown in FIG. 9.

The fifth message may carry the first data and an address of the fifth memory. For example, the fifth message may carry the first data and a VA of the fifth memory.

The first data may include at least one type of the following data: constant data of an operating system in a compilation phase, and constant data of the operating system in an initialization phase.

The fifth memory is a memory configured to store the first data.

S1320. The processing module running in the second running space writes the first data into the fifth memory based on the fifth message.

In this embodiment of this application, because the processing module in the fourth running space needs to modify data in a memory by using the processing module in the second running space, whose exception level is higher than an exception level of the processing module running in the fourth running space, that is, the processing module in the fourth running space cannot directly modify the data in the memory. Therefore, the method can improve data security.

In addition, compared with that in the method in FIG. 10, in the method in this embodiment of this application, the data in the memory may be modified, and therefore has higher flexibility.

In this embodiment of this application, optionally, the processing module running in the second running space may write the first data into the fifth memory based on a request of the fifth message only when the fifth message is sent by a pre-specified module, to further improve the data security, thereby improving operating system security.

For example, the hypervisor writes the first data into the fifth memory only when a patch program in the operating system invokes the hypervisor by using an HVC instruction.

To be specific, in an implementation of this embodiment of this application, step S1320 may specifically include: when the fifth message is sent by the pre-specified processing module to the processing module running in the second running space, the processing module running in the second running space writes the first data into the fifth memory based on the request of the fifth message.

In another embodiment of this application, the data protection method shown in FIG. 13 may be used together with the method shown in at least one of FIG. 10 to FIG. 12.

For example, the data protection apparatus 800 may generate a memory protection table by using the method in FIG. 11 and/or FIG. 12, then may determine, by using the method shown in FIG. 10, whether a memory is protected, and may modify data by using the data protection method shown in FIG. 13.

If the data protection method shown in FIG. 10 and the data protection method shown in FIG. 11 are used together, the fourth running space and the first running space may be a same running space.

For example, both the fourth running space and the first running space may be kernel space, the processing module in the first running space may be the operating system, and the processing module in the fourth running space may be the patch program in the operating system.

FIG. 6 is a schematic structural diagram of a data protection apparatus according to an embodiment of this application. It should be understood that the data protection apparatus 600 shown in FIG. 6 is merely an example. The data protection apparatus in this embodiment of this application may further include other modules or units, modules having functions similar to functions of modules in FIG. 6, or not necessarily include all the modules in FIG. 6.

The data protection apparatus 600 includes a processor execution unit 610 and a memory management unit 620. A running space divided by the processor execution unit 610 includes a first running space 611 and a second running space 612, an exception level of the second running space is higher than an exception level of the first running space, a first processing module runs in the first running space, and a second processing module runs in the second running control.

The data protection apparatus 600 may be configured to perform the step performed by the data protection apparatus in any data protection method shown in FIG. 9 to FIG. 13.

For example, the first processing module is configured to send a first message to the memory management unit 620, where the first message is used to request to modify an attribute of a first memory.

The memory management unit 620 is configured to send a second message to the second processing module, where the second message is used to request to determine whether the first memory is protected.

The second processing module is configured to determine, based on a pre-obtained memory protection table, whether the first memory is protected.

The second processing module sends a third message to the memory management unit 620, where the third message is used to indicate whether to modify the attribute of the first memory.

The memory management unit is configured to: when the third message is used to instruct to modify the attribute of the first memory, modify the attribute of the first memory based on the first message; and when the third message is used to instruct not to modify the attribute of the first memory, reject modifying the attribute of the first memory.

Optionally, the first processing module is specifically configured to send a fourth message to the second processing module in the second running space, where the fourth message is used to indicate whether the first memory is protected.

The second processing module is specifically configured to generate the memory protection table based on the fourth message, where the memory protection table is used to record a protected memory and/or an unprotected memory, the protected memory includes a memory configured to store protected data, and the unprotected memory includes a memory configured to store unprotected data.

Optionally, the second processing module is specifically configured to: determine that the first memory is configured to store protected data or determine that the first memory is configured to store unprotected data; and generate the memory protection table, where the memory protection table is used to record that the first memory is a protected memory or is used to record that the first memory is an unprotected memory, the protected memory includes a memory configured to store the protected data, and the unprotected memory includes a memory configured to store the unprotected data.

Optionally, the first running space is kernel space, the first processing module is an operating system, and the protected data includes: constant data written by the operating system into a memory in a compilation phase, and constant data written by the operating system into the memory in an initialization phase.

Optionally, the data protection apparatus 600 may further include a memory, where the memory is configured to store program code that is executed by the processor execution unit 610 and data.

Optionally, the data protection apparatus 600 may be a mobile phone, a tablet computer, a server, a personal computer, a network router, or a switch.

A person of ordinary skilled in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus and unit, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A kernel integrity protection method comprising:
   sending, by a first program executing at a first exception level, a request message to a second program executing at a second exception level, wherein the first exception level has lower execution privilege than the second exception level, wherein the first exception level corresponds to a kernel, the first program is an operating system, the second exception level corresponds to a hypervisor or a secure monitor, the request message requests to perform memory access, and wherein the memory access is a preset register access or a preset memory space access, wherein sending the request message comprises:
      sending a first message to a memory management unit for requesting to modify an attribute of a first memory; and
      sending, by the memory management unit, a second message to the second program for requesting to determine whether the first memory is protected; and
   based on a memory protection table, determining, by the second program, whether the first memory is protected;
   sending, by the second program, a third message to the memory management unit, wherein the third message indicates whether to modify the attribute of the first memory; and
   if the third message indicates to modify the attribute of the first memory, modifying, by the memory management unit, the attribute of the first memory based on the first message and;
   in response to receiving the request message, obtaining, by the second program, event information corresponding to the memory access;
   sending, by the second program, the event information to the first program; and
   processing, by the first program, the event information, wherein the processing comprises sending, by the first program to a third program executing at a third exception level, a message based on the event information, wherein the third exception level has lower execution privilege than the first exception level.

2. The method according to claim 1, wherein the first exception level corresponds to a kernel, the first program is an operating system, the second exception level.

3. The method according to claim 1, wherein the preset register access comprises at least one of reading or writing a system control register.

4. The method according to claim 1, wherein the preset memory space access comprises at least one of modifying a kernel code segment, disabling a memory management unit, modifying a kernel page table, or modifying a user page table.

5. The method according to claim 1, wherein the processing the event information comprises:
   sending, by the first program based on the event information to the third program, an indication indicating to end a process corresponding to the event information.

6. The method according to claim 1, wherein processing the event information comprises reporting, by the first program to the third program, a log comprising the event information.

7. The method according to claim 6, further comprising:
   uploading, by the third program, the log to a cloud server; and
   receiving, by the third program, a security policy or a patch from the cloud server.

8. The method according to claim 5, wherein the third program is a user application.

9. The method according to claim 1, wherein the event information comprises at least one of an attack type, a name of an attack process, or a port number.

10. The method according to claim 1, further comprising:
    before determining whether the first memory is protected, sending, by the first program, a fourth message to the second program, wherein the fourth message indicates whether the first memory is protected; and
    generating, by the second program based on the fourth message, the memory protection table, wherein the memory protection table records at least one of a protected memory storing protected data or an unprotected memory storing unprotected data.

11. The method according to claim 10, wherein the first program is an operating system, the protected data comprises constant data written by the operating system into a memory in a compilation phase, and constant data written by the operating system into the memory in an initialization phase.

12. The method according to claim 1, further comprising:
    determining, by the second program, whether the first memory stores protected data or unprotected data; and
    generating, by the second program, the memory protection table, wherein the memory protection table records at least one of a protected memory storing protected data or an unprotected memory storing unprotected data.

13. The method according to claim 1, wherein the method is performed by a mobile phone, a tablet computer, a server, a personal computer, a network router, or a switch.

14. A computing device comprises:
  at least one processor; and
  a non-transitory computer-readable storage medium coupled to the at least one processor and storing programming instructions for execution by the at least one processor, the programming instructions instruct the at least one processor to:
  cause a first program executing an a first exception level to send a request message to a second program executing at a second exception level, wherein the first exception level has lower execution privilege than the second exception level, wherein the first exception level corresponds to a kernel, the first program is an operating system, the second exception level corresponds to a hypervisor or a secure monitor, the request message requests to perform memory access, and wherein the memory access is a preset memory space access, wherein sending the request message comprises:
    sending a first message to a memory management unit for requesting to modify an attribute of a first memory; and
    sending, by the memory management unit, a second message to the second program for requesting to determine whether the first memory is protected; and
  cause the second program to determine, based on a memory protection table, whether the first memory is protected;
  cause the second program to send a third message to the memory management unit, wherein the third message indicates whether to modify the attribute of the first memory; and
  if the third message indicates to modify the attribute of the first memory, cause the memory management unit to modify the attribute of the first memory based on the first message;
  cause the second program to, obtain, in response to receiving the request message, event information corresponding to the memory access, and send the event information to the first program; and
  further cause the first program to process the event information, wherein the processing comprises sending, by the first program to a third program executing at a third exception level, a message based on the event information, wherein the third exception level has lower execution privilege than the first exception level.

15. The computing device according to claim 14, wherein the first exception level corresponds to a kernel, the first program is an operating system, the second exception level corresponds to a hypervisor or a secure monitor.

16. The computing device according to claim 14, wherein the preset register access comprises at least one of reading or writing a system control register.

17. The computing device according to claim 14, wherein the preset memory space access comprises at least one of modifying a kernel code segment, disabling a memory management unit, modifying a kernel page table, or modifying a user page table.

18. The computing device according to claim 14, the programming instructions further instruct the at least one processor to:
  cause the first program to send, based on the event information to the third program, an indication indicating to end a process corresponding to the event information.

19. The computing device according to claim 14, wherein process the event information comprises reporting, by the first program to the third program, a log comprising the event information.

* * * * *